US007864171B2

(12) United States Patent
Oomori et al.

(10) Patent No.: US 7,864,171 B2
(45) Date of Patent: Jan. 4, 2011

(54) DISPLAY APPARATUS, SOURCE DRIVER AND DISPALY PANEL

(75) Inventors: Tetsurou Oomori, Osaka (JP); Yoshito Date, Shiga (JP)

(73) Assignee: Panasonic Corporation, Osaka (JP)

( * ) Notice: Subject to any disclaimer, the term of this patent is extended or adjusted under 35 U.S.C. 154(b) by 731 days.

(21) Appl. No.: 11/976,953

(22) Filed: Oct. 30, 2007

(65) Prior Publication Data

US 2008/0084411 A1 Apr. 10, 2008

Related U.S. Application Data

(62) Division of application No. 10/800,734, filed on Mar. 16, 2004, now Pat. No. 7,304,621.

(30) Foreign Application Priority Data

Apr. 9, 2003 (JP) ............................ 2003-105694

(51) Int. Cl.
*G06F 3/038* (2006.01)
*G09G 5/00* (2006.01)
*G09G 3/30* (2006.01)
*G09G 3/32* (2006.01)

(52) U.S. Cl. .......................... 345/212; 345/76; 345/77; 345/82; 345/83; 345/84; 345/87; 345/98; 345/99; 345/211

(58) Field of Classification Search .................. 345/76, 345/77, 82, 83, 84, 87, 88, 98, 99, 204, 690, 345/211, 212
See application file for complete search history.

(56) References Cited

U.S. PATENT DOCUMENTS 6,144,164 A 11/2000 Ito
6,191,535 B1 2/2001 Saitou
6,288,496 B1 9/2001 Suzuki et al.
6,366,026 B1 4/2002 Saito et al.

(Continued)

FOREIGN PATENT DOCUMENTS

EP 1204087 A1 5/2002

(Continued)

OTHER PUBLICATIONS

Notice of Reasons for Rejection dated Nov. 28, 2006.

(Continued)

*Primary Examiner*—My-Chau T Tran
(74) *Attorney, Agent, or Firm*—McDermott Will & Emery LLP

(57) ABSTRACT

An organic EL display apparatus includes: a display panel on which a plurality of pixel sections are provided; source drivers provided with pixel drivers, which includes current drivers for supplying drive currents to the pixel sections, registers for latching data signals and timing control units; signal lines for supplying the drive currents from the current drivers to the pixel sections. Each of the current drivers is controlled by the associated timing control unit to allow a current larger than or equal to a current which is set in accordance with the data signal to flow only during a given period in a current setting mode, so that the value of a current flowing in the pixel section reaches a target value in a short time.

7 Claims, 23 Drawing Sheets

U.S. PATENT DOCUMENTS

| | | | |
|---|---|---|---|
| 6,734,875 B1 | 5/2004 | Tokimoto et al. | |
| 6,765,560 B1 | 7/2004 | Ozawa | |
| 6,839,057 B2 | 1/2005 | Iguchi | |
| 6,958,742 B2 | 10/2005 | Date et al. | |
| 7,180,515 B2 | 2/2007 | Miyagawa et al. | |
| 7,304,621 B2 * | 12/2007 | Oomori et al. | 345/82 |
| 2003/0137475 A1 | 7/2003 | Yoshida et al. | |

FOREIGN PATENT DOCUMENTS

| | | |
|---|---|---|
| JP | 4-42619 | 2/1992 |
| JP | 10-186325 | 7/1998 |
| JP | 11-45071 | 2/1999 |
| JP | 2000-122608 | 4/2000 |
| JP | 2002-123219 | 4/2002 |
| JP | 2002-244618 | 8/2002 |
| JP | 2002-351403 | 12/2002 |
| JP | 2003-43993 | 2/2003 |
| JP | 2003-43994 | 2/2003 |
| JP | 2003-58106 | 2/2003 |
| JP | 2003-66908 | 3/2003 |
| JP | 2003-76327 | 3/2003 |
| JP | 2003-114645 | 4/2003 |
| JP | 2004-4789 | 1/2004 |
| JP | 2004-029755 | 1/2004 |
| JP | 2004-37656 | 2/2004 |
| JP | 2004-252419 | 9/2004 |
| WO | WO 00/57397 | 9/2000 |
| WO | WO 03/023752 | 3/2003 |
| WO | WO 03/091977 A1 | 11/2003 |

OTHER PUBLICATIONS

Chinese Office Action, with English Translation, issued in corresponding Chinese Patent Application No. 200410033470.4, dated on Aug. 17, 2007.

Japanese Office Action, with English Translation, issued in corresponding Japanese Patent Application No. JP 2007-013703, mailed on Nov. 20, 2007.

* cited by examiner

XXVb
XXVb 1101
1107
1108
1109
1110

I-V CURVE OF TFT
I-V
CHARACTERISTIC
OF DRIVER OUTPUT
I
V
Vblack≒4V
1005a1
TFT
TFT
EL
1220a1
1001a1
1112
1113
1114
1115
1116
1117

I-V CURVE OF TFT
I-V
CHARACTERISTIC
OF DRIVER OUTPUT
I
V
Vwhite≒2V
1005an
TFT
TFT
EL
1220an
1001an
1212
1213
1214
1215
1216
1217

PRIOR ART

PRIOR ART

DISPLAY APPARATUS, SOURCE DRIVER AND DISPALY PANEL

This application is a Divisional of U.S. application Ser. No. 10/800,734, filed Mar. 16, 2004 now U.S. Pat. No. 7,304,621, claiming priority of Japanese Patent Application No. 2003-105694, the entire contents of each of which are hereby incorporated by reference.

BACKGROUND OF THE INVENTION

The present invention relates to a display apparatus including a light-emitting device driven by current such as an organic electro luminescence (EL) device, to a source driver used in the display apparatus, and to a display panel.

In an active matrix type image display apparatus, a large number of pixels are arranged in a matrix pattern and the intensity of light is controlled for every pixel depending on provided luminance information, thereby displaying an image. For this purpose, a rectangular display panel, for example, includes thin-film-transistors (TFTs) arranged in a matrix pattern and controlling the state of liquid crystal or an optical material, source drivers provided along the upper and lower sides of the panel and gate drivers provided at the lateral sides of the panel.

Most of the conventional image display apparatuses such as display panels have used liquid crystal as an optical material. In each of these image display apparatuses, a liquid crystal driver as a source driver supplies display information in the form of voltages to respective pixels so that the transmissivities of pixels change depending on the display information.

On the other hand, image display apparatuses using organic EL devices as light-emitting devices have been intensively developed in recent years. Unlike liquid crystal, the organic EL devices emit light by themselves, so that display panels using the organic EL devices have the advantages of high visibility and the unnecessity of back lighting. The organic EL devices used for the display panels function as diodes and emit light upon the application of current.

FIG. 23 is a circuit block diagram schematically showing a configuration of a conventional organic EL display apparatus.

As shown in FIG. 23, the conventional organic EL display apparatus includes: a display panel; a pixel section 1005 provided on the display panel; a transmission path 1003 connected to the pixel section 1005; and a pixel driver 1001 included in a source driver and used for supplying a drive current to the pixel section 1005 via the transmission path 1003. The transmission path 1003 includes a line for connecting the source driver and the display panel to each other and a signal line provided on the display panel. The transmission path 1003 shown in FIG. 23 includes resistances and capacitances, which respectively indicate wiring resistances and stray capacitances.

The pixel driver 1001 includes a plurality of current sources. The sum of the currents flowing from current sources which are in a conductive state is supplied as an output current to the pixel section 1005 connected to the associated signal line.

The pixel section 1005 includes: a current generator 1011 having a pixel input capacitance 1007 and a current source 1008; and an organic EL device 1009 connected to the current source 1008. The "pixel section" shown in FIG. 23 is composed of three sub-pixel sections for displaying R (red), G (green) and B (blue), respectively, in reality.

Now, the configurations of the pixel driver and the pixel section and a black and white display of the organic EL display apparatus will be described.

FIG. 24A is an enlarged view showing a display panel in the case of a black and white display in the conventional organic EL display apparatus. FIG. 24B is a circuit diagram showing pixel sections arranged on the XXVb-XXVb line on the display panel shown in FIG. 24A and pixel drivers connected to the respective pixel sections. FIG. 24C is a graph showing an operating point of a TFT in a black display mode. FIG. 24D is a graph showing an operating point of the TFT in a white display mode.

As shown in FIG. 24B, a plurality of pixel drivers shown in FIG. 23 are arranged in a source driver. Specifically, the conventional source driver includes: a first pixel driver 1001$a_1$; a second pixel driver 1001$a_2$; . . . ; an n-th pixel driver 1001$a_n$; and a reference current generator 1101 for generating a current to be supplied to the respective pixel drivers 1001.

The reference current generator 1101 includes: a first pMOSFET 1108 whose source receives a power-supply voltage; a resistance 1107 connected to the first MOSFET 1108 at one terminal and grounded at the other terminal; a second pMOSFET 1109 forming a current mirror together with the first MOSFET 1108; and a third nMOSFET 1110 whose drain is connected to the drain of the second MOSFET 1109 and whose source is grounded.

Each of the pixel drivers 1001 is composed of a plurality of current sources forming current mirrors together with the third MOSFET 1110 and switches connected to the respective current sources. For example, in a display apparatus producing a display of 64 levels of gray scale, the first pixel driver 1001$a_1$ includes: a first current source 1112 for outputting a current I; a second current source 1113 for outputting a current 2I; third, fourth and fifth current sources (not shown) for outputting currents 4I, 8I and 16I, respectively; a sixth current source 1114 for outputting a current 32I; and switches 1115, 1116 and 1117 connected to the respective current sources. The current sources are composed of nMOSFETs forming current mirrors together with the third MOSFET 1110.

Each of the sub-pixel sections of the pixel section 1005 shown in a simplified manner includes: an organic EL device 1009; a first TFT connected to the pixel driver 1001; and a second TFT forming a current mirror together with the first TFT and used for supplying a current input to the first TFT to the organic EL device 1009. In this example, the TFTs on the panel are pMOSFETs, so that a current is drawn from a pixel into a pixel driver in actual operation.

In a case of a black and white display as shown in FIG. 24A, all the switches in the pixel driver 1001$a_1$ are OFF and a pixel section 1005$a_1$ producing a black display is charged by the power supply voltage. In this case, as shown in FIG. 24C, even when the voltage at the output terminal of the source driver is high, a current flowing is very small. The point of intersection of the IV (current·voltage) curve of the TFT and the I-V characteristic curve of output of the source driver is the operating point of the TFT.

On the other hand, with respect to a pixel section 1005$a_n$ producing a white display, all the switches in the pixel driver 1001$a_1$ are ON, so that charge is drawn from the pixel section 1005$a_n$ into the pixel driver 1001$a_n$. In this case, as shown in FIG. 24D, the operating point of the TFT shifts to lower potentials than in the case of the black display. The "black display" may be also referred to as "a low-luminance display" and the "white display" may be also referred to as "a high-luminance display".

Now, specific examples of a configuration of the current generator 1011 shown in FIG. 23 will be described.

FIGS. 25A and 25B are circuit diagrams respectively showing examples of a configuration of a current generator in a general organic EL pixel section.

A current generator 1011 shown in FIG. 25A includes: a first switching transistor M4 connected to a pixel driver at one terminal; a second switching transistor M3 connected to the first switching transistor M4 in series; a capacitance C1 connected to the first and second switching transistors M4 and M3 in series and receiving a power-supply voltage at one terminal; a first p-channel TFT M2 whose drain is connected to a line connecting the first and second switching transistors M4 and M3 to each other and whose source receives a power-supply voltage; and a second TFT M1 forming a current mirror together with the first TFT M2 and having its drain connected to the organic EL device 1009. The line connecting the capacitance C1 and the second switching transistor M3 to each other is connected to the line connecting the gate electrodes of the first and second TFTs M2 and M1 to each other. Both the first and second switching transistors M4 and M3 are pMOSFETs in this example and have their operation controlled with control signals K1.

In the current generator 1011 shown in FIG. 25A, in a current setting mode, both the first and second switching transistors M4 and M3 are ON with the control signals K1 so that a current flows into the pixel driver 1001 and the capacitance C1 is charged by the gate voltage Vc1. When the capacitance C1 is charged, a constant current flows through each of the first and second TFTs M2 and M1. The "current setting mode" herein refers to a period from when a horizontal scanning period starts to when the current flowing in the pixel section 1005 reaches a target value.

In a display mode, both the first and second switching transistors M4 and M3 are OFF with the control signals K1. In this period, the gate voltage Vc1 is held by the capacitance C1, so that a current continuously flows from the second TFT M1 to the organic EL device 1009 in the same amount as that in the current setting mode.

A current generator 1011 shown in FIG. 25B includes: a first switching transistor M4 connected to a pixel driver 1101 at one terminal; a capacitance C1 receiving a power-supply voltage at one terminal and connected to the first switching transistor M4 at the other terminal; a second switching transistor M3 interposed between the first switching transistor M4 and the capacitance C1; a TFT M1 whose gate electrode is connected to the capacitance C1 and the second switching transistors M3, whose source receives a power-supply voltage and whose drain is connected to the organic EL device 1009; and a third switching transistor M5 interposed between the TFT M1 and the organic EL device 1009. The drain of the TFT M1 is also connected to the first and second switching transistors M4 and M3. The first and second switching transistors M4 and M3 are controlled with first control signals K1. The third switching transistor M5 is controlled with a second control signal K2, which is a signal of opposite phase to that of the first control signals K1.

In this current generator 1011 shown in FIG. 25B, in the current setting mode, both the first and second switching transistors M4 and M3 are ON with the first control signals K1 and the third switching transistor M5 is OFF with the second control signal K2. In this period, a current flows from the current generator 1011 to the pixel driver and the capacitance C1 is charged by the gate voltage Vc1. When the capacitance C1 is charged, a constant current flows into the TFT M1.

In the display mode, both the first and second switching transistors M4 and M3 are OFF and the third switching transistor M5 is ON. In this period, the gate voltage Vc1 is held by the capacitance C1, so that a current continuously flows from the TFT M1 to the organic EL device 1009 in the same amount as that in the current setting mode.

SUMMARY OF THE INVENTION

FIG. 26 shows graphs showing respective changes in the value of a current flowing in the pixel section 1005 and in the value of a voltage applied to the pixel section 1005 in a black display mode in the conventional organic EL display apparatus. In FIG. 26, the abscissa indicates time (t) and the ordinate indicates current (I) or voltage (V).

The organic EL display apparatus includes a stray capacitance 1220 occurring on a line and a pixel input capacitance 1007 as shown in FIG. 23. Accordingly, in the conventional organic EL display apparatus, in a black display mode, charge can be disadvantageously consumed to charge the stray capacitance 1220 and the pixel input capacitance 1007, so that the charge is not transmitted to the organic EL device 1009 as previously set in some cases. As a result, as shown in FIG. 26, time t1 required for the current flowing in the organic EL device 1009 to reach a target value is long.

The charging for a black display is usually performed within the time obtained by dividing a frame period by the number of horizontal lines. A value around 70 Hz is often used as the frame period. To fabricate a panel having a large number of display pixels, the number of horizontal lines increases, to reduce the charging period for each line. In view of this, in order to achieve a high display resolution using the conventional organic EL display panel, the discharging time is inevitably shortened, resulting in the disadvantage of deterioration of the image quality.

In contrast to the black display, in the case of a white display, it is necessary to relieve the charge accumulated in capacitances such as the stray capacitance 1220 and the pixel input capacitance 1007 toward the pixel driver. Accordingly, to enhance the resolution using the conventional organic EL display apparatus, the discharging period needs to be short, causing the possibility of deterioration of the image quality. The "deterioration of the image quality" herein means the deterioration of color reproducibility due to an inappropriate luminance.

An object of the present invention is therefore providing a display apparatus capable of producing a high-resolution display without loss of image quality when a low-luminance display is changed to a high-luminance display or when a high-luminance display is changed to a low-luminance display and a driver IC and a display panel which are used for achieving the display apparatus.

A first inventive display apparatus includes: a display panel provided with a pixel section including a light-emitting device driven by a current and with a signal line connected to the pixel section; and a source driver for supplying a drive current to the pixel section via the signal line, wherein the source driver includes: a register for latching display data having N bits and for outputting the display data; a timing control unit for outputting a control signal; and a current driver for allowing the drive current which has been set at an arbitrary value to flow during a given period in a current setting mode, while allowing the drive current which has been set with the display data output from the register to flow during the operation periods other than the given period, in accordance with the control signal.

With this configuration, the current flowing in the current driver is set at an optimum value within the given period in the current setting mode, so that the time required for the current flowing in the pixel section to reach a target value is shortened as compared to a conventional apparatus. In particular, when a high-luminance display is switched to a low-luminance display rapidly, charge accumulated in the display panel is drawn into the source driver, so that the required time is effectively shortened. As a result, it is possible to increase the number of horizontal lines without loss of image quality, thus achieving a high-resolution display.

In particular, the current driver preferably outputs the drive current with a value larger than or equal to a current value set with the display data output from the register, during the given period in the current setting mode. Then, the time required for the current flowing in the pixel section to reach the target value is shortened as compared to a conventional apparatus.

The current driver may include: a current mode D/A converter including N current sources for outputting currents according to the bits of the display data; an additional current source for outputting a current with an arbitrary value; and a first switch for receiving the control signal and electrically connecting the additional current source and the pixel section to each other only during the given period in the current setting mode. Then, an optimum current is allowed to flow appropriately from the additional current source only during the given period in the current setting mode. As a result, the time required for the current flowing in the pixel section to reach the target value is shortened as compared to a conventional apparatus.

The N current sources in the D/A converter may be constituted by MISFETs forming current mirrors with each other, and the additional current source may be constituted by one or more MISFETs forming current mirrors together with the MISFETs constituting the N current sources.

The additional current source preferably receives the display data and is capable of outputting a current according to the bits of the display data. Then, currents suitable for respective display data items flow from the additional current source, so that the time required for the current flowing in the pixel section to reach the target value is reduced more effectively.

The current driver may be a current mode D/A converter including: N current sources for outputting currents according to the bits of the display data; second switches respectively provided on output paths of currents flowing in the respective N current sources; N bypasses for shunting and outputting the currents flowing in the N current sources, by way of the respective second switches; and third switches respectively provided on the N bypasses, wherein the third switches are ON with the control signal during the given period in the current setting mode, whereas the third switches are OFF with the control signal during the operation periods other than the given period. Then, the time required for the current flowing in the pixel section to reach the target value is also reduced more effectively.

The value of the current output from the current driver may change stepwise during the given period in the current setting mode. Then, the amount of the overshoot of the voltage applied to the pixel section in the current setting mode shown is reduced. As a result, the time required for the current flowing in the pixel section to reach the target value is also reduced more effectively.

The current driver is preferably a current mode D/A converter including: N current sources for outputting currents according to the bits of the display data; second switches respectively provided on output paths of currents flowing in the respective N current sources; N bypasses for shunting and outputting the currents flowing in the N current sources, by way of the respective second switches; and third switches respectively provided on the N bypasses, wherein during the given period in the current setting mode, the third switches are turned ON with the control signal and then turned OFF sequentially from the third switch connected to the current source associated with the most significant bit.

The source driver preferably further includes: voltage setting means for outputting a given voltage; and a comparator for comparing the output voltage of the voltage setting means with an output voltage of the current driver and outputting the comparison result to the timing control unit, wherein while the drive current with the arbitrary value flows from the current driver during the given period, the value of the drive current is switched to a current value set with the display data corresponding to a detection that the output voltage of the current driver becomes equal to the output voltage of the voltage setting means. Then, the voltage setting means sets a voltage suitable for reducing the time required for the current flowing in the pixel section to reach the target value (hereinafter referred to as “current setting period”). Accordingly, the current setting period is shortened effectively.

The given voltage output from the voltage setting means is preferably a stable output voltage which is the output voltage of the current driver when the value of a current flowing in the pixel section reaches a target value in the current setting mode. Then, the current setting period is shortened effectively.

The voltage setting means is preferably a dummy circuit including: a dummy pixel section which is provided on the display panel, includes a TFT and a capacitance and is not used for a display; a dummy signal line provided on the display panel and supplying a current to the dummy pixel section; and a dummy pixel driver provided in the source driver, connected to the dummy signal line and the comparator and including a dummy current driver for outputting a constant current during operation. Then, the output current from the current driver is set at an appropriate value with reference to the output voltage of the dummy pixel driver which has reached a voltage value close to a stable output voltage. Accordingly, the current setting period is shortened effectively.

It is preferable that the current driver is plural in number, and the dummy circuit is singular in number with respect to the plurality of current drivers especially when area reduction is needed because increase of the circuit area is suppressed with this configuration.

The source drivers are preferably respectively provided on a plurality of semiconductor chips having an identical structure, and the dummy pixel driver is preferably provided on each of the semiconductor chips. In this case, it is unnecessary to prepare a plurality of types of semiconductor chips as source drivers. In addition, the input and output configuration to/from the display panel is simplified. Moreover, the dummy circuits are automatically arranged at given intervals so that variation of the effect of shortening the current setting period depending on the position on the display panel is suppressed.

A second inventive display apparatus includes: a display panel provided with a pixel section including a light-emitting device driven by a current and with a signal line connected to the pixel section; and a source driver for supplying a drive current to the pixel section via the signal line, wherein the signal line is divided into a drive-voltage signal line for setting the drive current supplied to the pixel section and a drive-current signal line for transmitting the drive current supplied to the pixel section, and the source driver includes a voltage driver for supplying a drive voltage to the pixel section via the drive-voltage signal line and current supplying means for allowing the drive current to flow into the pixel section via the drive-current signal line.

With this configuration, the pixel section is driven by the voltage driver having a lower output impedance than the current driver used in the first inventive display apparatus, so that the current setting period is shortened effectively both when a low-luminance display is switched to a high-luminance display and when a high-luminance display is switched to a low-luminance display. The pixel section may have any configuration as long as the pixel section is driven by both current and voltage.

The current supplying means may be a current value detector for detecting the value of a drive current flowing from the pixel section and for feeding back the detection result to the voltage driver, and the source driver may further include a register for latching display data and inputting the display data to the current value detector. Then, if the value of the current flowing from the pixel section into the current detector exceeds a predetermined value, the output voltage from the voltage driver is controlled to reduce the value of the current flowing from the pixel. This feedback control is achieved so that it is possible to shorten the current setting period effectively without providing any special control from the outside.

The current value detector may be connected to the drive-current signal line and include: a current driver capable of changing the value of a current output from the current driver in accordance with the display data; and a resistance provided on a connection path between the current driver and the drive-current signal line, and a voltage generated between the current driver and the resistance is input to the voltage driver as the detection result.

The second inventive display apparatus may further include short-circuit means for making a short circuit between the voltage driver and the current supplying means only during a given period in a current setting mode. Then, the current setting period is also shortened.

A third inventive display apparatus includes: a display panel provided with a pixel section including a light-emitting device driven by a current and with a signal line connected to the pixel section; and a source driver for supplying a drive current to the pixel section via the signal line, wherein the source driver includes: a register for latching display data having N bits and for outputting the display data; a current driver for outputting the drive current according to the display data input from the register; voltage supplying means having an output impedance lower than that of the current driver; a line for connecting the signal line and the voltage supplying means to each other; a timing control unit for outputting a control signal; and a short-circuit switch provided on the line and used for electrically connecting the signal line and the voltage supplying means to each other only during a given period in a current setting mode in accordance with the control signal.

With this configuration, the pixel section is driven by the voltage from the voltage supplying means having a lower output impedance than the current driver during the given period in the current setting mode. Accordingly, charge is drawn into the source driver rapidly in a high-luminance display mode, whereas a capacitance on the display panel is charged rapidly in a low-luminance display mode. As a result, the current setting period is shortened remarkably than in a conventional display apparatus.

The voltage supplying means may include: a dummy circuit including: a dummy pixel section which is provided on the display panel, includes a TFT and a capacitance and is not used for a display; a dummy signal line provided on the display panel and used for supplying a current to the dummy pixel section; and a dummy pixel driver provided in the source driver, connected to the dummy signal line and including a dummy current driver for outputting a constant current during operation; and a current amplifying buffer connected to the dummy current driver and used for outputting an output voltage of the dummy current driver to the signal line. Then, the output voltage of the dummy current driver which has reached in a steady state is supplied to the pixel section, so that the current setting period is effectively shortened.

The current driver may be plural in number, the voltage supplying means may be singular in number with respect to the plurality of current drivers. Then, large increase of the circuit area is suppressed as well as the current setting period is shortened.

The voltage supplying means is preferably a voltage-output D/A converter provided in a one-to-one correspondence with the current driver and capable of changing an output voltage of the D/A converter in accordance with the display data output from the register. Then, the output voltage is generated within a semiconductor chip.

The voltage-output D/A converter preferably changes the output voltage of the D/A converter in accordance with the one or two most significant bits of the display data. Then, increase of the circuit area is suppressed as well as the current setting period is shortened.

The voltage supplying means may be a line connected to an external power supply.

A fourth inventive display apparatus includes: a display panel provided with a pixel section including a light-emitting device driven by a current and with a signal line connected to the pixel section; and a source driver for supplying a drive current to the pixel section via the signal line, wherein the source driver includes: a register for latching display data having N bits and for outputting the display data; bit-data adding means for adding M bits to the display data input from the and for outputting a display data having (N+M) bits register during a given period in a current setting mode; a timing control unit for outputting a control signal; and a current driver for allowing the drive current which is set with the display data having (N+M) bits to flow during the given period in the current setting mode, while allowing the drive current which is set with the display data having N bits during the operation periods other than the given period, in accordance with the control signal.

With this configuration, a current larger than or equal to a current which should be originally output from the current driver is temporarily output during the given period in the current setting mode, so that it is possible to shorten the current setting period.

The M bits are preferably one or two bits. Then, large increase of the circuit area is suppressed.

A fifth inventive display apparatus includes: a display panel provided with a pixel section including a light-emitting device driven by a current and with a signal line connected to the pixel section; and a source driver including a register for latching display data having N bits and for outputting the display data, a current driver for outputting a drive current according to the bits of the display data to the signal line and a reference current generator for supplying a reference current to the current driver, wherein the current driver includes N current sources constituted by MISFETs forming current mirrors with each other, the reference current generator includes: a first MISFET whose source receives a power-supply voltage and which allows the reference current to flow; and a variable resistance which is connected to a drain of the first MISFET and whose resistance value changes depending on the display data when the display data is input thereto; a second MISFET forming a current mirror together with the first MISFET; and a third MISFET connected to the second MISFET and used for supplying the reference current to each of the N current sources via a current mirror, and the display data output from the register is input to the variable resistance during a given period in a current setting mode.

With this configuration, the value of the variable resistance changes depending on the display data in the current setting mode, so that the value of the current flowing in the current driver is adjusted at an appropriate value. As a result, the current setting period can be effectively shortened as compared to a conventional apparatus.

A first inventive source driver includes: a register for latching display data having N bits and for outputting the display data; a timing control unit for outputting a control signal; and a current driver for allowing the drive current which has a value larger than or equal to a current value set with the display data to flow during a given period in a current setting mode, while allowing the drive current which is set with the display data output from the register during the operation periods other than the given period, in accordance with the control signal.

Then, in a display apparatus using this source driver, it is possible to have the current flowing in the pixel section reach a target current in a short time in the current setting mode. That is, the use of this source driver achieves a current-driven display apparatus having a higher resolution than a conventional apparatus.

The source driver may further include: voltage setting means for outputting a given voltage; and a comparator for comparing the output voltage of the voltage setting means with an output voltage of the current driver and for outputting the comparison result to the timing control unit, wherein while the drive current with the value larger than or equal to the current value set with the display data flows from the current driver during the given period, the value of the drive current is switched to the current value set with the display data corresponding to a detection that the output voltage of the current driver becomes equal to the output voltage of the voltage setting means. Then, in a display apparatus using this source driver, it is possible to have the current flowing in the pixel section in the current setting mode reach a target current in a shorter time than in a conventional apparatus.

A second inventive source driver includes: a voltage driver for supplying a voltage; a register for latching and outputting display data; current supplying means for receiving the display data output from the register and for allowing a current according to the display data to flow.

With this source driver, a display apparatus having a shorter current setting period than a conventional apparatus is achieved.

A third inventive source driver includes: a register for latching display data having N bits and for outputting the display data; a current driver having an output terminal for outputting the drive current according to the display data input from the register; voltage supplying means having an output impedance lower than that of the current driver; a line for connecting the output terminal of the current driver and the voltage supplying means; a timing control unit for outputting a control signal; and a short-circuit switch provided on the line and used for electrically connecting the line and the voltage supplying means to each other only during a given period in a current setting mode in accordance with the control signal.

With this source driver, a display apparatus having a shorter current setting period than a conventional apparatus is achieved.

A fourth inventive source driver includes: a register for latching display data having N bits and for outputting the display data; bit-data adding means for adding M bits to the display data input from the register and for outputting a display data having (N+M) bits; a timing control unit for outputting a control signal during a given period in a current setting mode; and a current driver for allowing a current which is set with the display data having (N+M) bits to flow during the given period in the current setting mode, while allowing a current which is set with the display data having N bits during the operation periods other than the given period, in accordance with the control signal.

With this source driver, a display apparatus having a shorter current setting period than a conventional apparatus is achieved.

A fifth inventive source driver includes: a register for latching display data having N bits and for outputting the display data; a current driver for outputting a drive current according to the bits of the display data to a signal line; and a reference current generator for supplying a reference current to the current driver, wherein the current driver includes N current sources constituted by MISFETs forming current mirrors with each other, the reference current generator includes: a first MISFET whose source receives a power-supply voltage and which allows the reference current to flow; and a variable resistance which is connected to a drain of the first MISFET and whose resistance value changes depending on the display data when the display data is input thereto; a second MISFET forming a current mirror together with the first MISFET; and a third MISFET connected to the second MISFET and used for supplying the reference current to each of the N current sources via a current mirror, and the display data output from the register is input to the variable resistance during a given period in a current setting mode.

With this source driver, a display apparatus having a shorter current setting period than a conventional apparatus is achieved.

A first display panel includes: a pixel section including a light-emitting device driven by a current; a signal line connected to the pixel section; a dummy pixel section which is not used for a display; and a dummy signal line connected to the dummy pixel section.

With this display panel, a display apparatus having a shorter current setting period than a conventional apparatus is achieved.

A second display panel includes: a pixel section including a light-emitting device driven by a current, the pixel section being driven by a voltage and a current; drive-voltage signal line for supplying a drive voltage to the pixel section; and drive-current signal line for outputting a drive current in the pixel section.

With this display panel, a display apparatus having a shorter current setting period than a conventional apparatus is achieved.

DESCRIPTION OF THE PREFERRED EMBODIMENTS

Embodiment 1

Figure 1:
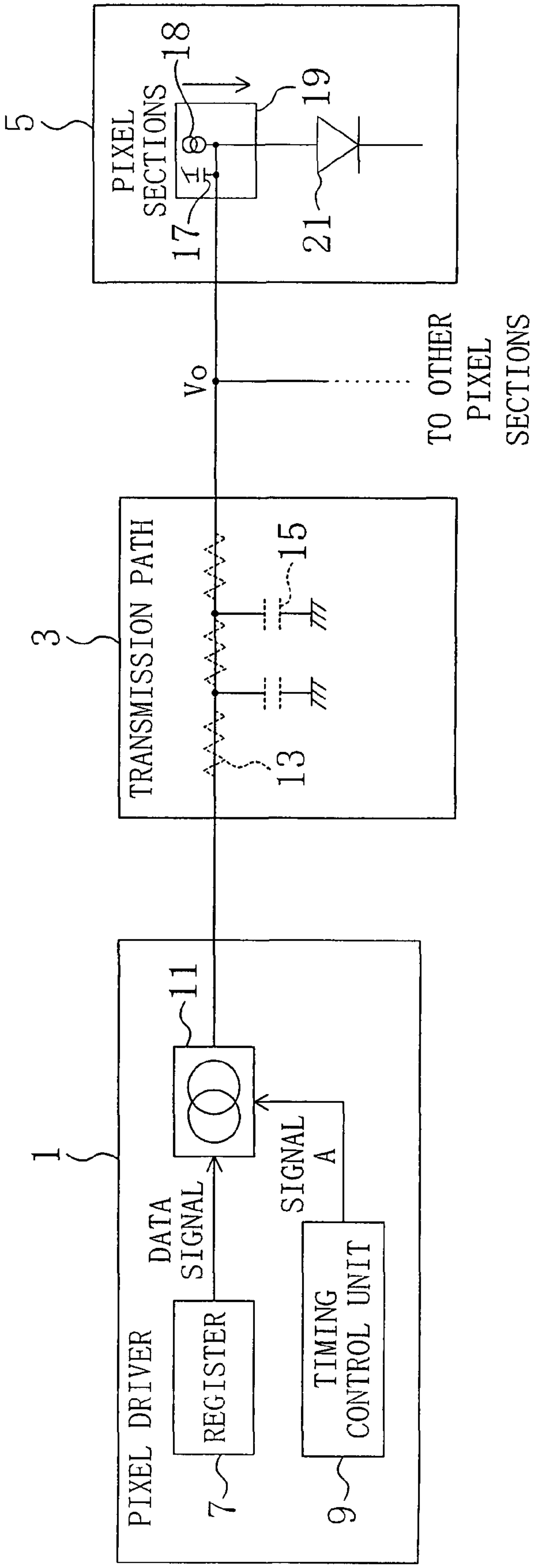
FIG. 1 is a block circuit diagram schematically showing a configuration of an organic EL display apparatus according to a first embodiment of the present invention.

FIG. 1 is a circuit block diagram schematically showing a configuration of an organic EL display apparatus according to a first embodiment of the present invention. The organic EL display apparatus of this embodiment is characterized in that a predetermined amount of current flows from a pixel driver 1 for a given period in a current setting mode, and then the value of the current that has been set is output from the pixel driver 1.

As shown in FIG. 1, the organic EL display apparatus of this embodiment includes: a display panel; a pixel section 5 provided on the display panel and used for displaying an image; a transmission path 3 connected to the pixel section 5; and a pixel driver 1 included in a source driver and used for supplying a drive current to the pixel section 5 via the transmission path 3. The transmission path 3 includes a line connecting the source driver 1 and the display panel to each other and a signal line provided on the display panel. The transmission path 3 shown in FIG. 1 includes resistances and capacitances, which respectively indicate wiring resistances and stray capacitances. The signal line is also connected to other pixel sections arranged in the direction of the signal line.

The pixel driver 1 includes: a current driver 11 for supplying a drive current to the pixel section 5; a register 7 for latching a data signal as display data and outputting the data signal to the current driver 11; and a timing control unit 9 for outputting a signal A for controlling an output current from the current control unit 11. Upon the reception of the signal A, current driver 11 outputs a current set at an arbitrary value only during a given period, while outputting a current with a value set according to a data signal during the operating period other than the given period in the current setting mode. In this case, the value of the current output from the current driver 11 only during the given period is preferably larger than or equal to that of the current set according to the data signal.

The configuration of the pixel section 5 is the same as in the conventional apparatus. Specifically, the pixel section 5 includes: a current generator 19 connected to the signal line and having a pixel input capacitance 17 and a current source 18; and an organic EL device 21 driven by the current output from the current generator 19.

Figure 2:
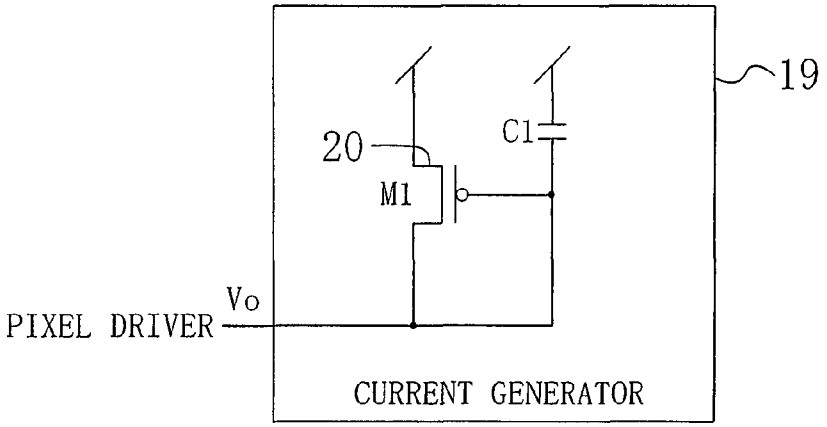
FIG. 2 is a circuit diagram showing a model of a current generator in a current setting mode in the organic EL display apparatus of the first embodiment.
Figure 25B:
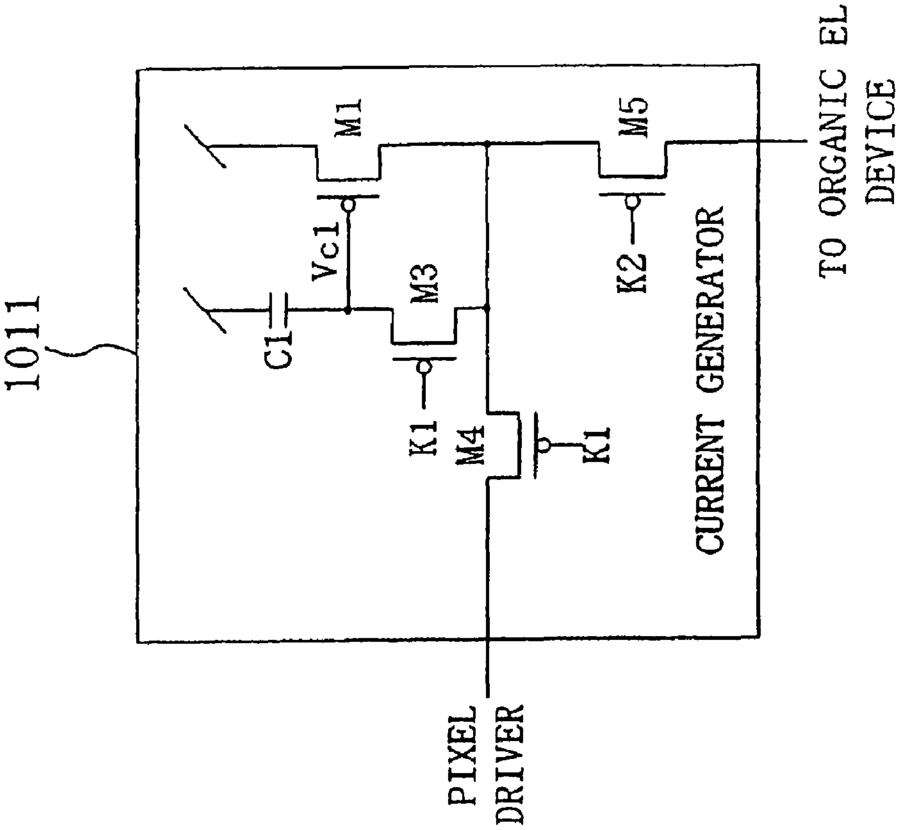
FIGS. 25A and 25B are circuit diagrams showing respective examples of a configuration of a current generator in a general organic EL pixel section.
Figure 25A:
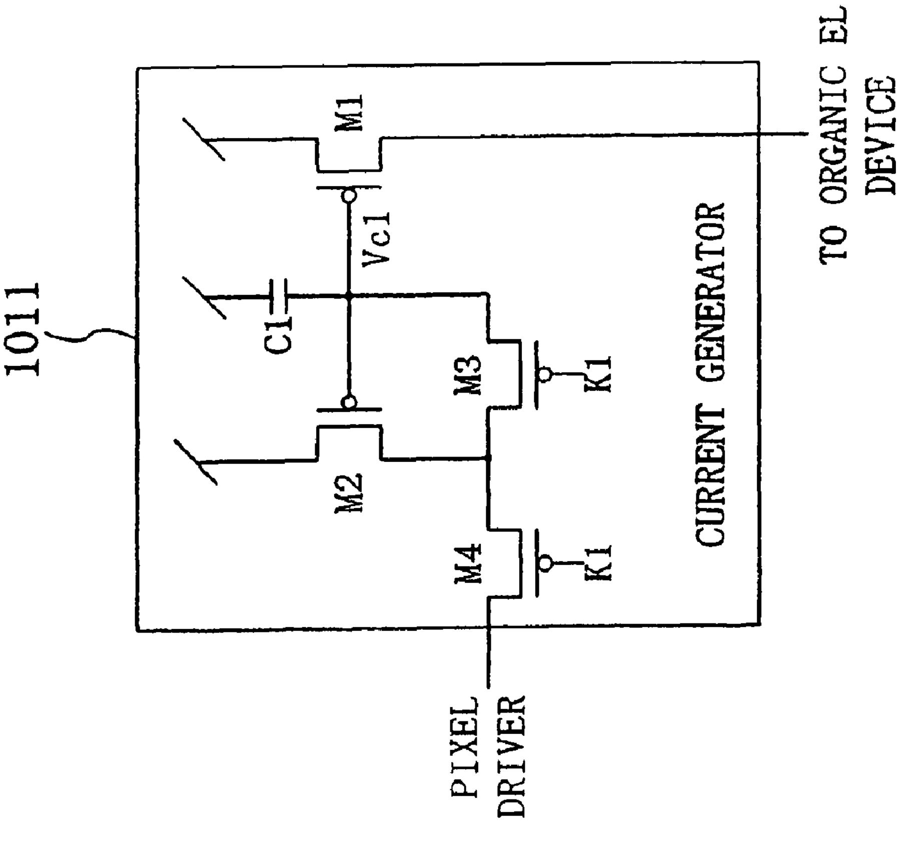
PRIOR ART FIG. 25A

FIG. 2 is a circuit diagram showing a model of the current generator 19 in the current setting mode. The configuration of the current generator 19 may be the same as those of the conventional generators as shown in FIGS. 25A and 25B, or may be other general configurations using TFTs. The model shown in FIG. 2 includes: a p-channel TFT 20 whose source receives a power-supply voltage and whose drain is connected to the pixel driver and to the gate electrode of itself; and a capacitance C1 (corresponding to the pixel input capacitance 17 shown in FIG. 1) for holding a gate voltage connected to the gate electrode of the TFT 20 and to the pixel driver. In FIG. 2, a TFT for supplying a current to the organic EL device 21 (e.g., the second TFT M1 shown in FIG. 25A) is omitted.

In the organic EL display apparatus of this embodiment, a large current flows from the panel to the pixel driver 1 in a current setting mode in which a black display is switched to a white display, for example, so that the charge accumulated in a stray capacitance 15 and the image input capacitance 17 can be released rapidly. Accordingly, the values of the current and voltage input from the current driver 11 to the pixel section 5 reach respective target values in a shorter time than in a conventional apparatus, resulting in a high display resolution of the organic EL display apparatus of this embodiment.

An organic EL display apparatus may produce a display after temporarily producing a black display for the purpose of smoothing the switching in display of moving images. In such a case, the organic EL display apparatus of this embodiment allows the current flowing in the pixel section 5 to reach a target value in a shorter time than in a conventional apparatus. As a result, operations of respective pixel sections can be unified.

Now, specific examples of the configuration of the current driver used in the organic EL display apparatus of this embodiment will be described.

First Specific Example

Figure 3:
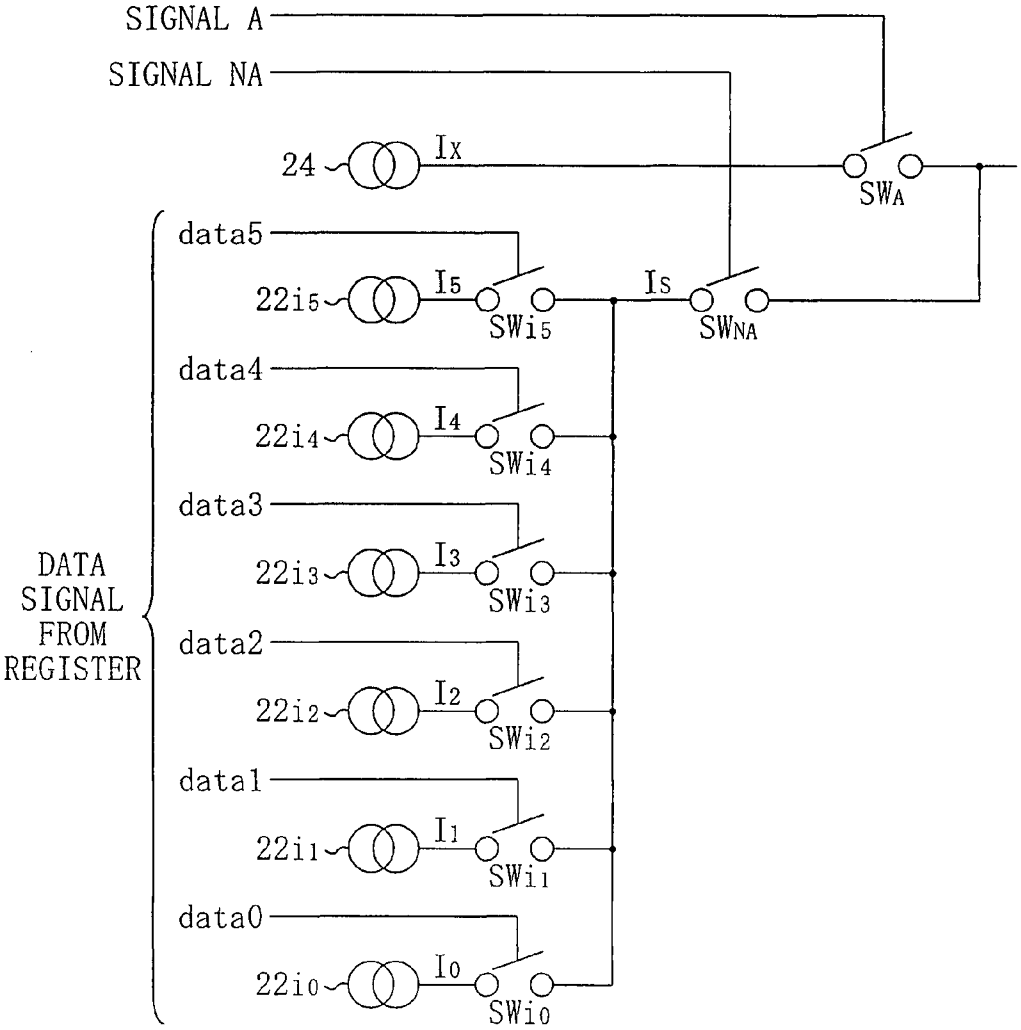
FIG. 3 is a circuit diagram showing a first specific example of a current driver in the organic EL display apparatus of the first embodiment.

FIG. 3 is a circuit diagram showing a first specific example of the current driver of the organic EL display apparatus of the first embodiment. In this example, the organic EL display apparatus produces a display of 6 bits, i.e., 64 levels of gray scale.

The current driver of this specific example shown in FIG. 3 includes: an additional current source 24 for supplying a constant current Ix; a current mode D/A converter for receiving a data signal output from the register 7 and outputting a current according to the data signal; a switch $SW_A$ for switching between ON and OFF of the current flowing in the additional current source 24; and a switch $SW_{NA}$ for switching between ON and OFF of an output current (drawn current) of the current mode D/A converter. The switch $SW_A$ is controlled with the signal A, and the switch $SW_{NA}$ is controlled with a signal NA, which is a signal of opposite phase to that of the first control signal A.

The current mode D/A converter includes: a first current source $22i_0$ for supplying a current $I_0$ which is the minimum current unit; a second current source $22i_1$ for supplying a current $I_1$ which is 2 times as large as the current $I_0$; a third current source $22i_2$ for supplying a current $I_2$ which is $2^2$ times as large as the current $I_0$; a fourth current source $22i_3$ for supplying a current $I_3$ which is $2^3$ times as large as the current $I_0$; a fifth current source $22i_4$ for supplying a current $I_4$ which is $2^4$ times as large as the current $I_0$; a sixth current source $22i_5$ for supplying a current $I_5$ which is $2^5$ times as large as the current $I_0$; a first switch $Swi_0$; a second switch $Swi_1$; a third switch $Swi_2$; a fourth switch $Swi_3$; a fifth switch $Swi_4$; and a sixth switch $Swi_5$. The first through sixth switches $Swi_0$ through $Swi_5$ control the ON and OFF states of currents flowing in the first through sixth current sources, respectively. The first through sixth switches $Swi_0$ through $Swi_5$ are turned ON or OFF with data signals data 0 through data 5, respectively. The sum of the currents flowing in the respective current sources in conductive states is drawn into the D/A converter as a current $I_S$. In this example, each of the data signals has 6 bits, but the number of bits is not limited to this. The D/A converter may output an output current in proportion to the display luminance. However, in another case, the D/A converter may output an output current which is not in proportion to the display luminance in order to correct the γ characteristic of the organic EL device. The foregoing description is also applicable to organic EL display apparatuses according to other embodiments.

If the organic EL display apparatus of this specific example uses N bits (where N is an integer of two or more), the number of current sources is N and the current source associated with the most significant bit (MSB) draws a current which is $2^{N-1}$ times as large as the current source associated with the least significant bit (LSB). The configuration of the D/A converter is the same as that of the conventional current driver shown in FIG. 24. For example, the current sources are composed of MOSFETs forming current mirrors with each other.

The current Ix flowing in the additional current source 24 has a value larger than that of the current $I_0$ which is the minimum current unit.

In the current driver of this specific example having the configuration described above, the switch $SW_A$ is ON and the switch $SW_{NA}$ is OFF during a given period in the current setting mode. During the operation periods other than the given period, e.g., in a display mode, the switch $SW_A$ is OFF and the switch $SW_{NA}$ is ON. Such a control allows a current to be drawn into the additional current source 24 during the given period when a high-luminance display is switched to a low-luminance display. Accordingly, the value of the current flowing in the pixel section 5 reaches a target value in a short time. As a result, it is possible to have the value of the current flowing from the current generator (see FIG. 1) to the organic EL device 21 reach a target value in a short time.

Figure 4:
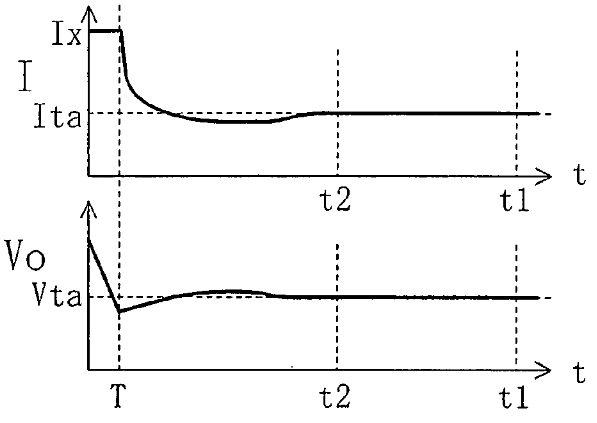
FIG. 4 shows graphs showing respective changes of a current I flowing in a pixel section 5 and of a voltage Vo applied to an input terminal of the pixel section 5 in the current setting mode in the organic EL display apparatus of this specific example.

FIG. 4 shows graphs showing respective changes of a current I flowing in the pixel section 5 and of a voltage Vo applied to an input terminal of the pixel section 5 in the current setting mode in the organic EL display apparatus of this specific example. FIG. 4 shows the changes when a black display is switched to a white display.

Figure 26:
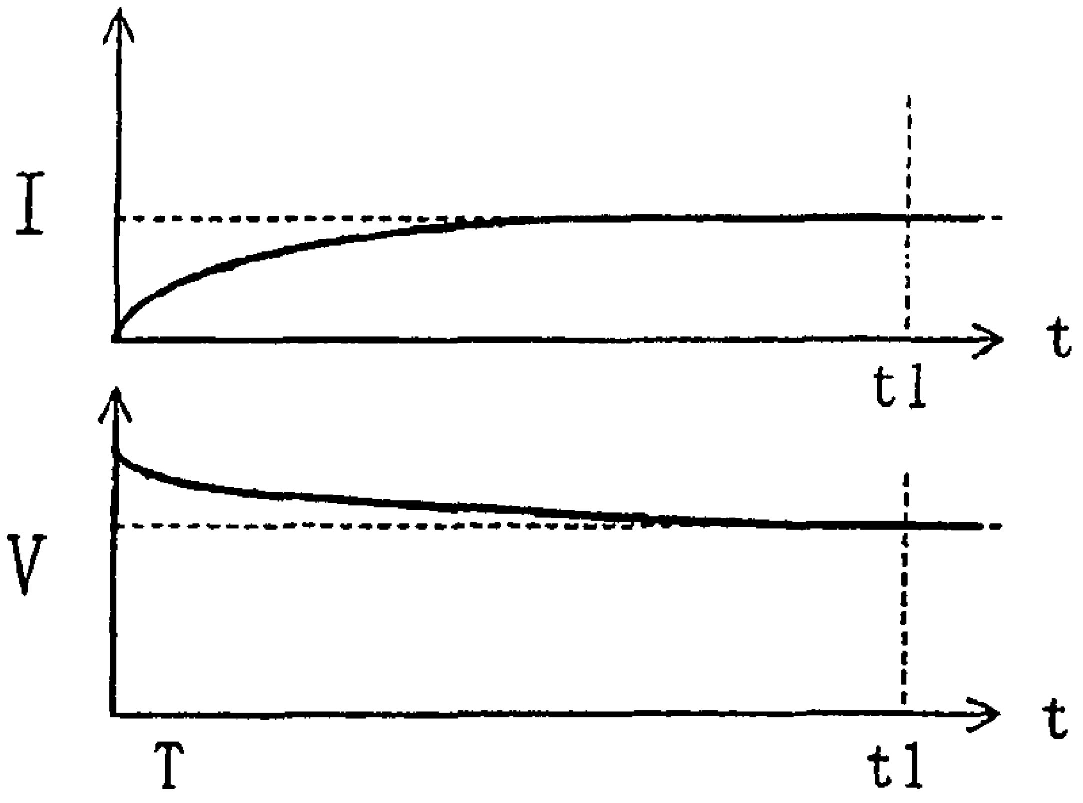
FIG. 26 shows graphs showing respective changes of the value of a current flowing in a pixel section and the value of a voltage applied to the pixel section in a black display mode in the conventional organic EL display apparatus.

As shown in FIG. 4, in the organic EL display apparatus of this specific example, a current Ix larger than that in the conventional example shown in FIG. 26 flows from the current generator 19 from time 0 to time T in the current setting mode. Accordingly, the voltage Vo applied to the input terminal of the pixel section 5 decreases sharply to approach a stable voltage Vta at time T. Therefore, a current flowing in the current driver 11 is switched to an original set current (a current Is shown in FIG. 3) at time T, and then reaches a target current Ita at time t2, which is earlier than time t1 in the conventional example. That is, the organic EL display apparatus of this specific example, provision of the additional current source 24 for allowing a predetermined current to flow for a given period reduces the time required for the value of the current flowing from the current driver 11 into the pixel section 5 to reach the target value in a shorter time than in the conventional organic EL display apparatus, when the low-luminance display (black display) is switched to the high-luminance display (white display). As a result, the organic EL display apparatus of this specific example achieves a high resolution without loss of display quality.

The target current value shown in FIG. 4 varies depending on the luminance of a pixel in a display mode. Accordingly, it is preferable to change the period T during which the current driver 11 outputs the current Ix depending on the luminance of the pixel. In this case, the time or timing when the timing control unit 9 shown in FIG. 1 turns ON the switch $SW_A$ shown in FIG. 3 with signal A may be appropriately controlled.

In this specific example, the organic EL device is used as a light-emitting device in the pixel section. Instead, a device driven by current such as a light-emitting diode may be used. This is also applicable to the embodiments described below. The configuration of the pixel driver used in the organic EL display apparatus of this embodiment is applicable to printer heads.

In the organic EL display apparatus of this specific example, the timing control unit 9 for outputting the signal A may be provided to each current driver or may be provided in singular to a plurality of current drivers. If the timing control unit 9 is shared by a plurality of current drivers, the circuit area is reduced.

Second Specific Example

Figure 5:
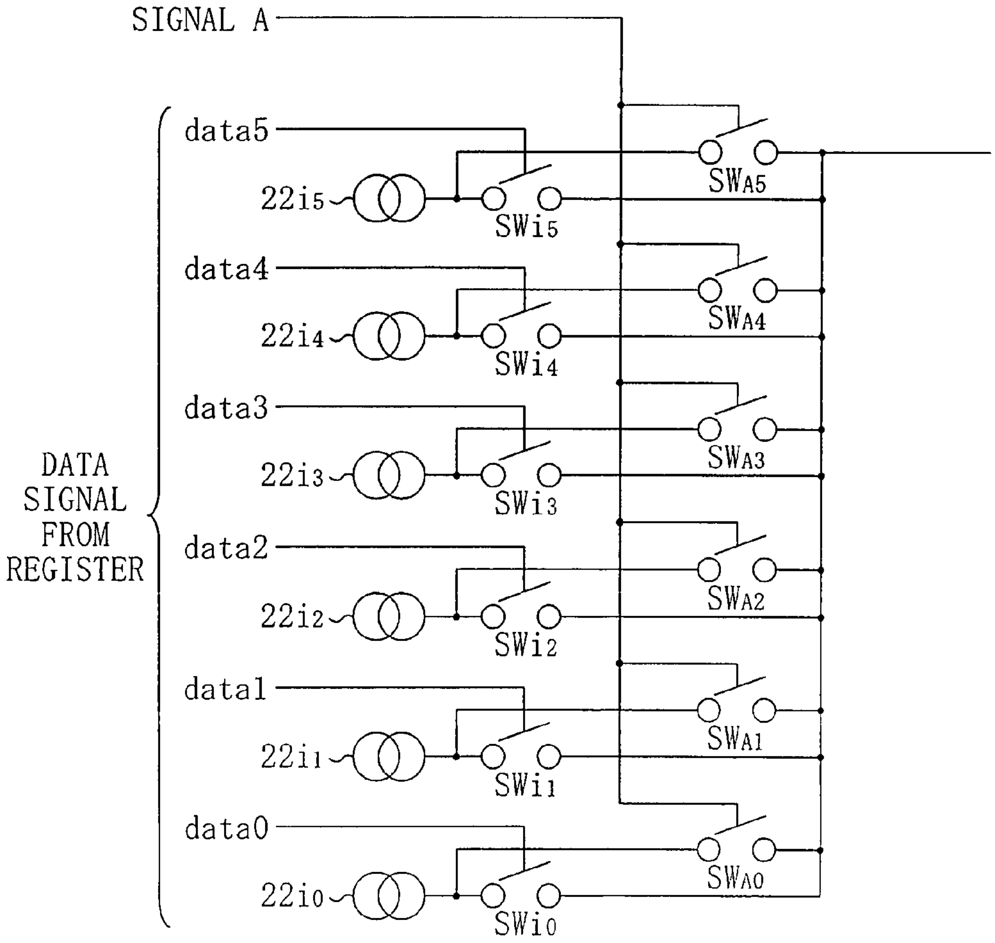
FIG. 5 is a circuit diagram showing a second specific example of the current driver in the organic EL display apparatus of the first embodiment.

FIG. 5 is a circuit diagram showing a second specific example of the current driver in the organic EL display apparatus of the first embodiment. In this specific example, no additional current source is provided, and the current driver allows the maximum output current to flow using the first through sixth current sources of the current mode D/A converter only during a given period in the current setting mode.

As shown in FIG. 5, the current driver of this specific example includes: a D/A converter having the same configuration as in the first specific example: bypasses respectively connecting the first through sixth current sources to an output terminal of the D/A converter; a switch $SW_{A0}$ provided between the first current source 22$i_0$ and the output terminal of the D/A converter; a switch $SW_{A1}$ provided between the second current source 22$i_1$ and the output terminal of the D/A converter; a switch $SW_{A2}$ provided between the third current source 22$i_2$ and the output terminal of the D/A converter; a switch $SW_{A3}$ provided between the fourth current source 22$i_3$ and the output terminal of the D/A converter; a switch $SW_{A4}$ provided between the fifth current source 22$i_4$ and the output terminal of the D/A converter; and a switch $SW_{A5}$ provided between the sixth current source 22$i_5$ and the output terminal of the D/A converter. The switches $SW_{A0}$ through $SW_{A5}$ are provided on the bypasses. Each of the switches $SW_{A0}$ through $SW_{A5}$ is ON with a signal A output from the timing control unit 9 shown in FIG. 1 only during a given period in the current setting mode, while being OFF in the other periods.

The first through sixth switches $SWi_0$ through $SWi_5$ are OFF when the respective switches $SW_{A0}$ through $SW_{A5}$ are ON.

In the current driver of this specific example with the configuration described above, a current which is the sum of the currents generated by all the first through sixth current sources flows during the given period in the current setting mode. This sum current is a current $I_{3F}$ for data 3F, i.e., 63 times as large as the minimum current unit in the case of a display of 64 levels of gray scale.

Figure 6:
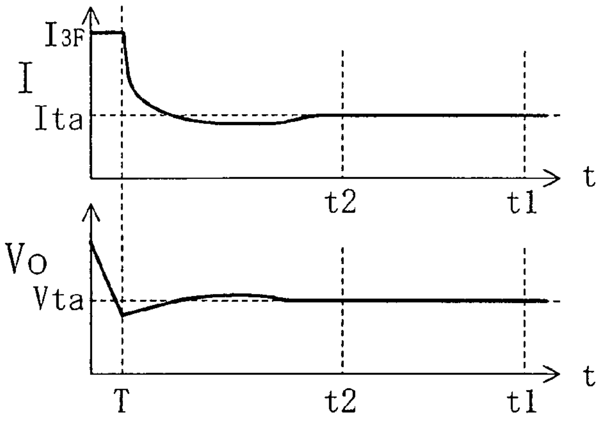
FIG. 6 shows graphs showing respective changes of a current I flowing from the current driver to the pixel section and of a voltage Vo applied to the pixel section in the current setting mode in the organic EL display apparatus of the second specific example of the first embodiment.

FIG. 6 shows graphs showing respective changes of a current I flowing from the current driver 11 to the pixel section 5 and of a voltage Vo applied to the pixel section 5 in the current setting mode in the organic EL display apparatus of this specific example. FIG. 6 shows the changes of the current I and the voltage Vo after a black display mode.

As shown in FIG. 6, in the organic EL display apparatus of this specific example, the current $I_{3F}$ that is the maximum current in the case of the display of 64 levels of gray scale is output from the current driver 11 from time 0 to time T in the current setting mode. Accordingly, the voltage Vo applied to the pixel section 5 decreases sharply to approach a stable voltage Vta at time T. Therefore, as in the first specific example, a current drawn into the current driver 11 is switched to an original set current (the current Is shown in FIG. 3) at time T, and then reaches a target current Ita at time t2, which is earlier than time t1 in a conventional apparatus. That is, in the organic EL display apparatus of this specific example, the maximum set current of the D/A converter is allowed to flow for a given period, so that the time required for the value of the current flowing into an input terminal of the pixel section 5 to reach the target value is reduced as compared to a conventional organic EL display apparatus, when a low-luminance display (black display) is switched to a high-luminance display (white display).

In particular, the current driver of this specific example includes no additional current source, so that the area of the current driver is reduced as compared to the first specific example.

In the current driver of this specific example, the bypasses are provided to all the first and sixth current sources so as to connect these current sources to the output terminal. Alternatively, the bypasses may be provided only to some of the current sources, e.g., to the fifth and sixth current sources 22$i_4$ and 22$i_5$, depending on the design of the display apparatus. In other words, the current temporarily output from the D/A converter is not necessarily the maximum set current.

In this specific example, the switches $SW_{A0}$ through $SW_{A5}$ for allowing currents to flow in the respective current sources associated with the number of bits are controlled with the common signal A. Alternatively, the switches $SW_{A0}$ through $SW_{A5}$ may be designed to be controlled with respective signals A0 through A5 which are independent of each other. In addition to this configuration, the timing control unit 9 can be designed to output the signals A0 through A5 to each of a plurality of current drivers connected to other signal lines. In this case, it is possible to program the operation of the timing control unit 9 so as to optimize the combination of current sources which are ON in the current setting mode. Then, the amount of the overshoot (temporary decrease below the set voltage) of the voltage shown in FIG. 6 is reduced. As a result, it is possible to have the value of the current flowing in the current driver and the current generator reach a target value in a shorter time.

Third Specific Example

Figure 7:
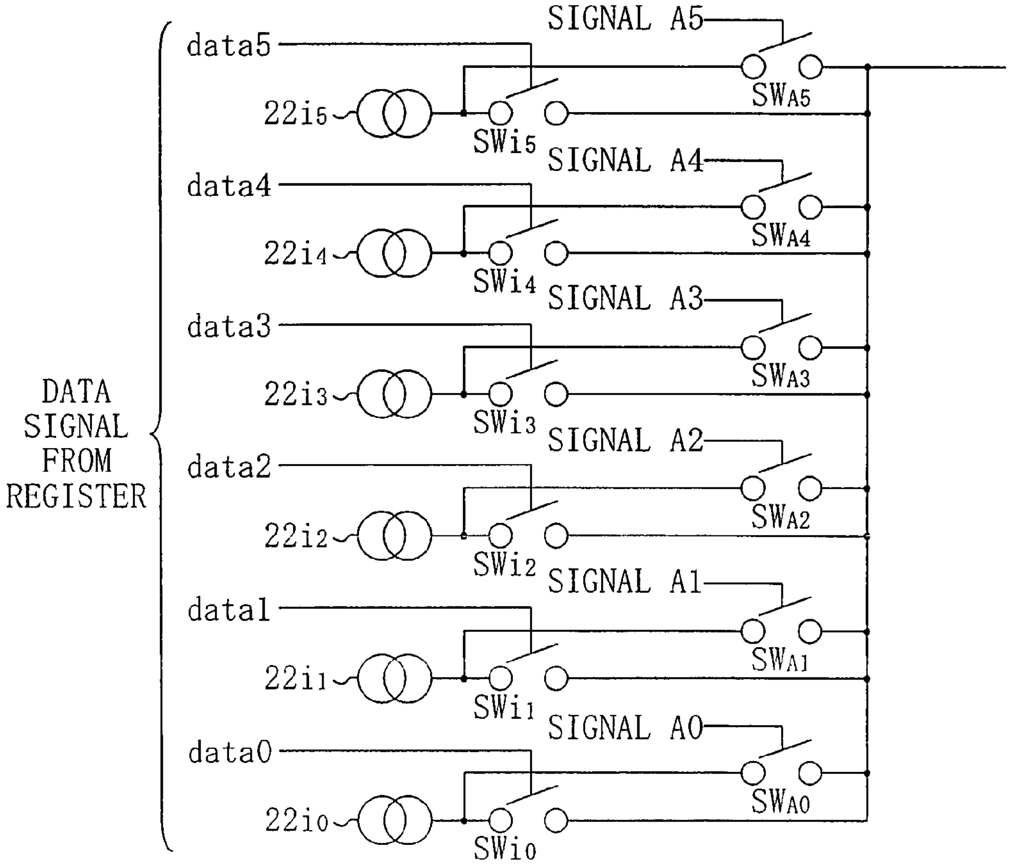
FIG. 7 is a circuit diagram showing a third specific example of the current driver in the organic EL display apparatus of the first embodiment.

FIG. 7 is a circuit diagram showing a third specific example of the current driver in the organic EL display apparatus of the first embodiment. This specific example is the same as the second specific example in that a current lager than a set current is allowed to flow using the first through sixth current sources of the current mode D/A converter during a given period in the current setting mode, but is different in that the current larger than or equal to the set current is allowed to flow, and then the value of the current flowing in the D/A converter is reduced stepwise.

As shown in FIG. 7, the current driver of this specific example includes: a D/A converter having the same configuration as in the first specific example: bypasses respectively connecting the first current source $22i_0$, the second current source $22i_1$, the third current source $22i_2$, the fourth current source $22i_3$, the fifth current source $22i_4$ and the sixth current source $22i_5$ to an output terminal of the D/A converter; the switch $SW_{A0}$ provided between the first current source $22i_0$ and the output terminal of the D/A converter; the switch $SW_{A1}$ provided between the second current source $22i_1$ and the output terminal of the D/A converter; the switch $SW_{A2}$ provided between the third current source $22i_2$ and the output terminal of the D/A converter; the switch $SW_{A3}$ provided between the fourth current source $22i_3$ and the output terminal of the D/A converter; the switch $SW_{A4}$ provided between the fifth current source $22i_4$ and the output terminal of the D/A converter; and the switch $SW_{A5}$ provided between the sixth current source $22i_5$ and the output terminal of the D/A converter.

This specific example is different from the second specific example in that the switches $SW_{A0}$ through $SW_{A5}$ are sequentially switched from ON to OFF with signals A0 through A5, respectively, which are independent of each other in the current setting mode. The signals A0 through A5 are output from the timing control unit 9 shown in FIG. 1 at given timings.

Now, operation of the current driver according to this specific example will be described with reference to the drawing.

Figure 8:
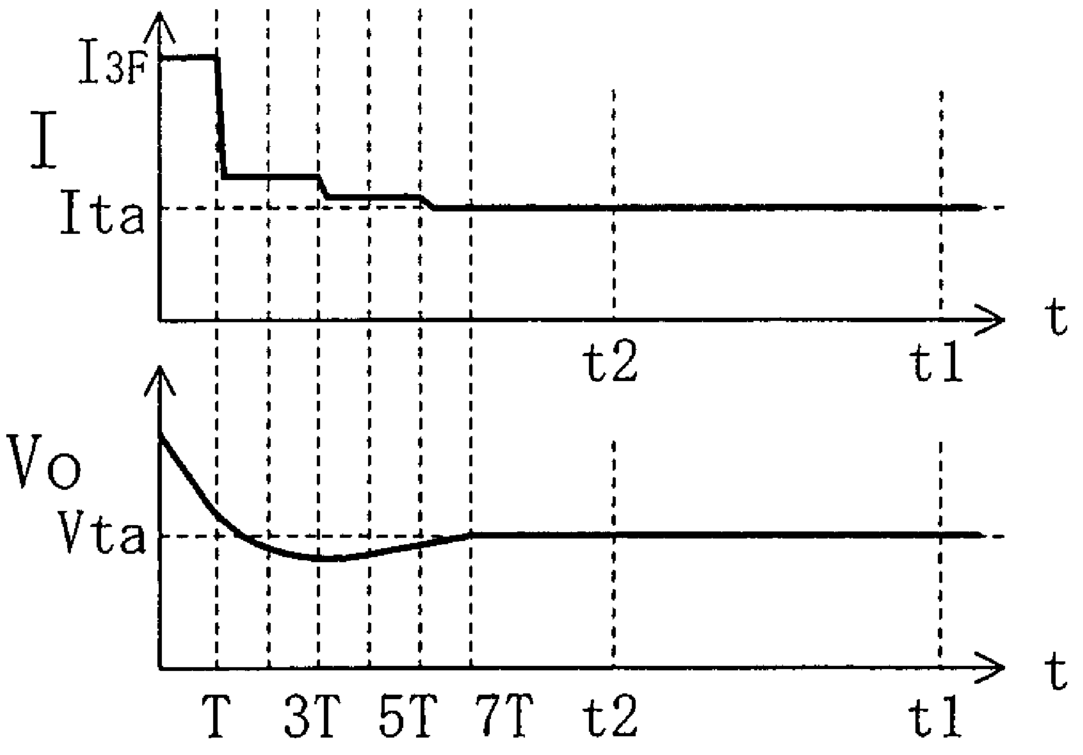
FIG. 8 shows graphs showing respective changes of a current I flowing from the current generator to the organic EL device and of a voltage Vo applied to the pixel section in the current setting mode in the organic EL display apparatus of a third specific example of the first embodiment.

FIG. 8 shows graphs showing respective changes of a current I flowing from the current generator to the organic EL device and of a voltage Vo applied to the pixel section 5 in the current setting mode in the organic EL display apparatus of this specific example.

As shown in FIG. 8, in the organic EL display apparatus of this specific example, a maximum current $I_{3F}$ in a case of a display of 64 levels of gray scale associated with data 3F ("3F" is in hexadecimal notation) flows from the current driver 11 from time 0 to time T in the current setting mode. In this period, the voltage Vo applied to an input terminal of the pixel section 5 decreases sharply to approach a target voltage Vta.

Next, at time T, the switches $SW_{A4}$ through $SW_{A5}$, for example, are turned OFF so that the two most significant bits are replaced with correct data to be displayed. This state continues from time T to time 3T. The current flowing in the pixel section 5 in this period further approaches the target value. During this period, the voltage applied to the input terminal of the pixel section 5 decreases gradually and is slightly below a stable voltage Vta at time 3T.

Then, at time 3T, the switches $SW_{A2}$ through $SW_{A3}$, for example, are also turned OFF so that the next two most significant bits are replaced with correct data to be displayed. This state continues from time 3T to time 5T. Accordingly, the voltage applied to the pixel section 5 further approaches the stable voltage during the period from time 3T to time 5T.

Thereafter, at time T5, the switches $SW_{A0}$ and $SW_{A1}$, for example, are further turned OFF so that the output current from the current driver is a set current according to all the 6 bits of data set in the register.

In this manner, the value of the output current from the current driver of this specific example is changed stepwise, so that the amount of the overshoot of the voltage applied to the pixel section 5 can be reduced. In addition, the current flowing in the pixel section 5 reaches the target current value in a shorter time than in the second specific example.

In this example, the amount of the current flowing in the current driver is changed at regular intervals (2T intervals) after time T, but may be changed at an arbitrary timing or in an arbitrary period. For example, after the current in the maximum set amount has been allowed to flow in the current driver so that the value of the current flowing in the pixel section 5 approaches the target value in a given period, the value of the current flowing in the current driver may be changed stepwise at short intervals to finally reach the value according to a data signal that has been set in the register. In such a case, the time required to reach the target current value can be reduced as compared to a conventional current driver. Alternatively, the amount of the current flowing in the current driver including the current in the maximum set amount may be changed at every given time T.

Such controls are performed with signals A0 through A5 output from the timing control unit 9 shown in FIG. 1.

In the current driver of this specific example, after the maximum current or an approximately maximum current has been allowed to flow, the current is switched stepwise to the set current two bits at a time in decreasing order from the most significant bit. Alternatively, the number of bits switched to the set current at a time may be one or three or more. The switching to the set current is preferably performed in decreasing order from a higher-order bit to a lower-order bit as in this specific example, but may be performed in any order.

Fourth Specific Example

In a fourth specific example of the first embodiment, a configuration of the timing control unit for implementing the organic EL display apparatus of the third specific example will be described. Specifically, the timing control unit of this specific example outputs signals A0 through A5 for changing the value of the current flowing in the current driver stepwise.

Figure 9:
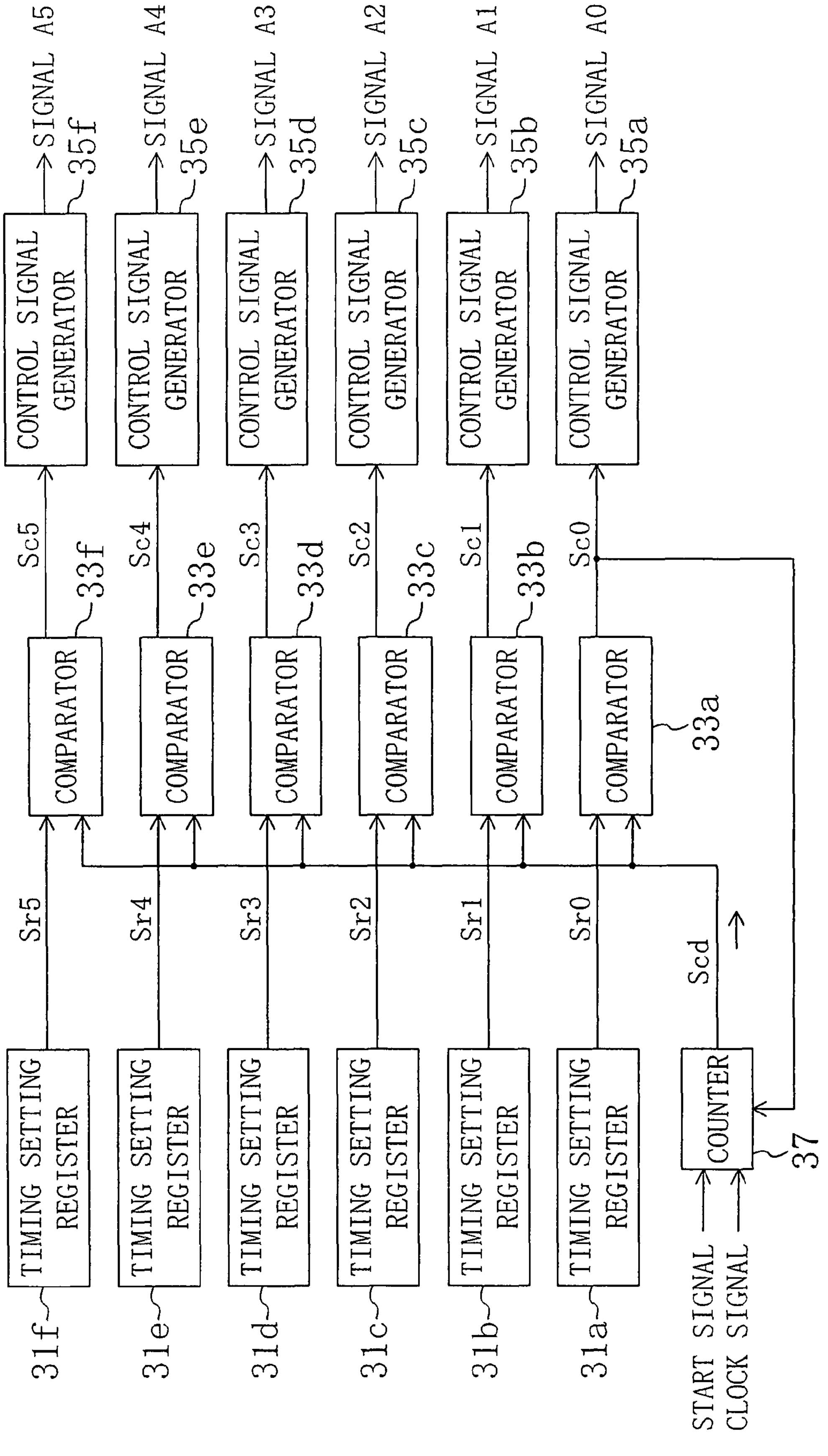
FIG. 9 is a block diagram showing an example of the configuration of a timing control unit according to a fourth specific example of the first embodiment.

FIG. 9 is a block diagram showing an example of the configuration of the timing control unit according to the fourth specific example of the first embodiment.

As shown in FIG. 9, the timing control unit of this specific example includes: timing setting registers 31*a*, 31*b*, 31*c*, 31*d*, 31*e* and 31*f* for outputting respective register signals Sr0, Sr1, Sr2, Sr3, Sr4 and Sr5; a counter 37 for performing counting operation upon reception of a start signal and a clock signal and outputting the value obtained by the counting operation as a count data signal Scd; comparators 33*a*, 33*b*, 33*c*, 33*d*, 33*e* and 33*f* for comparing the counter data signal Scd with the respective register data signals Sr0 through Sr5 and, when these signals have the same value, outputting identification signals Sc0 through Sc5, respectively; and control signal generators 35*a*, 35*b*, 35*c*, 35*d*, 35*e* and 35*f* for receiving the identification signals Sc0 through Sc5 and outputting signals A0 through A5, respectively.

For example, in the current setting mode, if the data is replaced with correct data one bit at a time in decreasing order from the most significant bit, data items "1", "2", "3", "4", "5" and "6" are set in the respective timing setting registers 31*f*, 31*e*, 31*d*, 31*c*, 31*b* and 31*a* beforehand, and the register data signals from these registers are output to the comparators 33*f*, 33*e*, 33*d*, 33*c*, 33*b* and 33*a*, respectively.

The counter 37 initiates its counting operation in synchronization with the clock signal upon the reception of the start signal. In accordance with the sequential regular-interval changes of the counter signals "1", "2", . . . which are output to the respective comparators, the comparators 33*f*, 33*e*, . . . output the identification signals Sc5, Sc4, . . . to the control signal generators 35*f*, 35*e*, . . . in this order. In this case, when the identification signal Sc0 that is finally output is fed back to the counter 37, the operation of the counter 37 is reset.

The control signal generators 35*f*, 35*e*, 35*d*, . . . and 35*a* output the signals A5, A4, A3, . . . and A0 to the current driver at regular intervals. The signals A5, A4, A3, . . . and A0 that have been once output are continuously output until the current setting mode terminates.

With the circuit operation described above, the current to flow into the current driver in the current setting mode is changed stepwise.

In this specific example, the signals A5 through A0 are output at regular intervals. However, if the data items previously set in the timing setting registers are set different from each other, the respective signals A5 through A0 are also output at different timings.

In this specific example, an example of the timing control unit for implementing the organic EL display apparatus of the third specific example is described. However, the circuit configuration for the above control is not limited to the configuration shown in FIG. 9.

The timing control unit of this specific example may be provided to every current driver or may be shared by a plurality of current drivers so that one timing control unit is provided in each LSI. In particular, if the signals A0 through A5 are used in common on a display panel, one timing control unit may be provided to each panel. In such a case where the timing control unit is shared by a plurality of current drivers, the increase in the circuit area can be suppressed.

Embodiment 2

Figure 10:
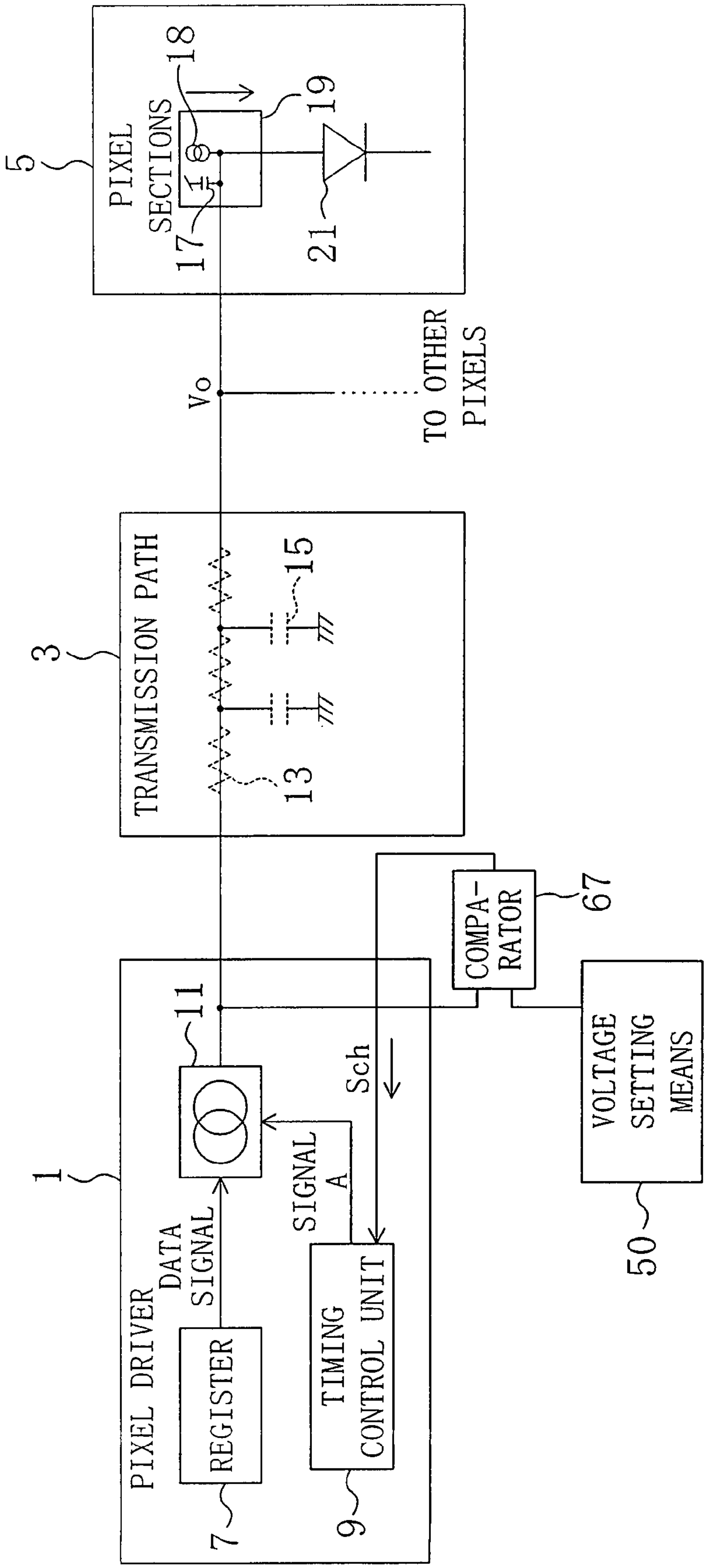
FIG. 10 is a circuit block diagram schematically showing a configuration of an organic EL display apparatus according to a second embodiment of the present invention.

FIG. 10 is a circuit block diagram schematically showing a configuration of an organic EL display apparatus according to a second embodiment of the present invention. In FIG. 10, each component also shown in FIG. 1 is identified by the same reference numeral and the description thereof will be omitted herein.

As shown in FIG. 10, the organic EL display apparatus of this embodiment is characterized in that the organic EL display apparatus of the first embodiment further includes: a voltage setting means 50 for setting a stable output voltage of a current driver 11 in a current setting mode; and a comparator 67 for comparing the output voltage of the current driver 11 with the output voltage of the voltage setting means 50 and outputting the comparison result to a timing control unit 9. The "stable output voltage of the current driver" herein refers to the output voltage of the current driver when the voltage applied to an input terminal of a pixel section 5 is a stable voltage (Vta shown in FIG. 4).

The voltage setting means 50 may be provided on a chip on which a source driver is provided, or otherwise, may be provided to extend from the source driver to a display panel. The latter case will be described in a later specific example.

In a case where the voltage setting means 50 is provided within the source driver, the voltage setting means 50 includes a register in which a stable output voltage with respect to the current driver 11 according to a data signal has been set beforehand. The stable output voltage is obtained by, for example, measuring the output voltages of the current driver 11 in display modes with different luminances. In a current setting mode, the stable output voltage set in a register is output to the comparator.

The comparator 67 compares the stable output voltage of the voltage setting means 50 with the output voltage of the current driver 11. In a current setting mode in which a low-luminance display is switched to a high-luminance display, if the output voltage of the current driver 11 is equal to or lower than the output voltage of the voltage setting means 50, the comparator 67 outputs a switching signal Sch to the timing control unit 9. On the other hand, in a current setting mode in which a high-luminance display is switched to a low-luminance display, if the output voltage of the current driver 11 is equal to or higher than the output voltage of the voltage setting means 50, the comparator 67 outputs the switching signal Sch to the timing control unit 9. However, since control for displaying with a low luminance first and then displaying an image is often performed in display operation, it is not always necessary to change the setting of the comparator 67 between the switching from a low-luminance display to a high-luminance display and the switching from a high-luminance display to a low-luminance display.

In the current setting mode, when the switching signal Sch is input to the timing control unit 9, the operation of the timing control unit 9 is reset, and the output current from the current driver 11 is switched to a set current according to the data signal. At this time, according to this embodiment, the output current from the current driver 11 is changed to the set current according to the data signal with a signal A output from the timing control unit 9.

Provision of the voltage setting means 50 and the comparator 67 described above allows the output current from the current driver 11 to be switched at an appropriate timing, so that it is possible to have the output current from a current generator 19 reach a target value in a shorter time than in a conventional apparatus. Accordingly, the organic EL display apparatus of this embodiment achieves an image display with high definition and high resolution, which has been difficult to achieve with the conventional apparatus, without loss of image quality.

The voltage setting means 50 and the comparator 67 of this embodiment are applicable to all the specific examples of the first embodiment.

As described above, if the voltage setting means 50 and the source driver are provided on a chip in the organic EL display apparatus of this embodiment, an existing display panel can be used, which is an advantage over the case where the voltage setting means 50 extends to the panel.

The comparator 67 may be provided on the panel, but is preferably provided within the source driver. An example of the comparator 67 in this case is a comparator using a differential amplifier.

The voltage setting means 50 may be provided to every current driver 11, or may be shared by a plurality of current drivers 11. To reduce the areas of the source driver and the display panel, it is preferable that the voltage setting means 50 is shared by a plurality of current drivers 11. In such a case, one or more voltage setting means 50 are more preferably provided on every semiconductor chip on which the source driver is provided. Then, to drive the display panel by source drivers provided on the chips, chips based on the same standard can be used, thus simplifying the input and output configuration of the source drivers. In addition, as compared to a case where the voltage setting means 50 is provided on a part of the source driver, the influences of variation among the chips and variation of positions on the panel are reduced.

The foregoing description is based on the assumption that the source driver is provided outside the display panel. However, the source driver may be incorporated in the display panel. This is also applicable to the other specific examples and the other embodiments.

Specific Example of Embodiment 2

In a specific example of the second embodiment, an organic EL display apparatus in which the voltage setting means 50 is provided to extend from the chip on which the source driver is provided to the display panel will be described.

Figure 11:
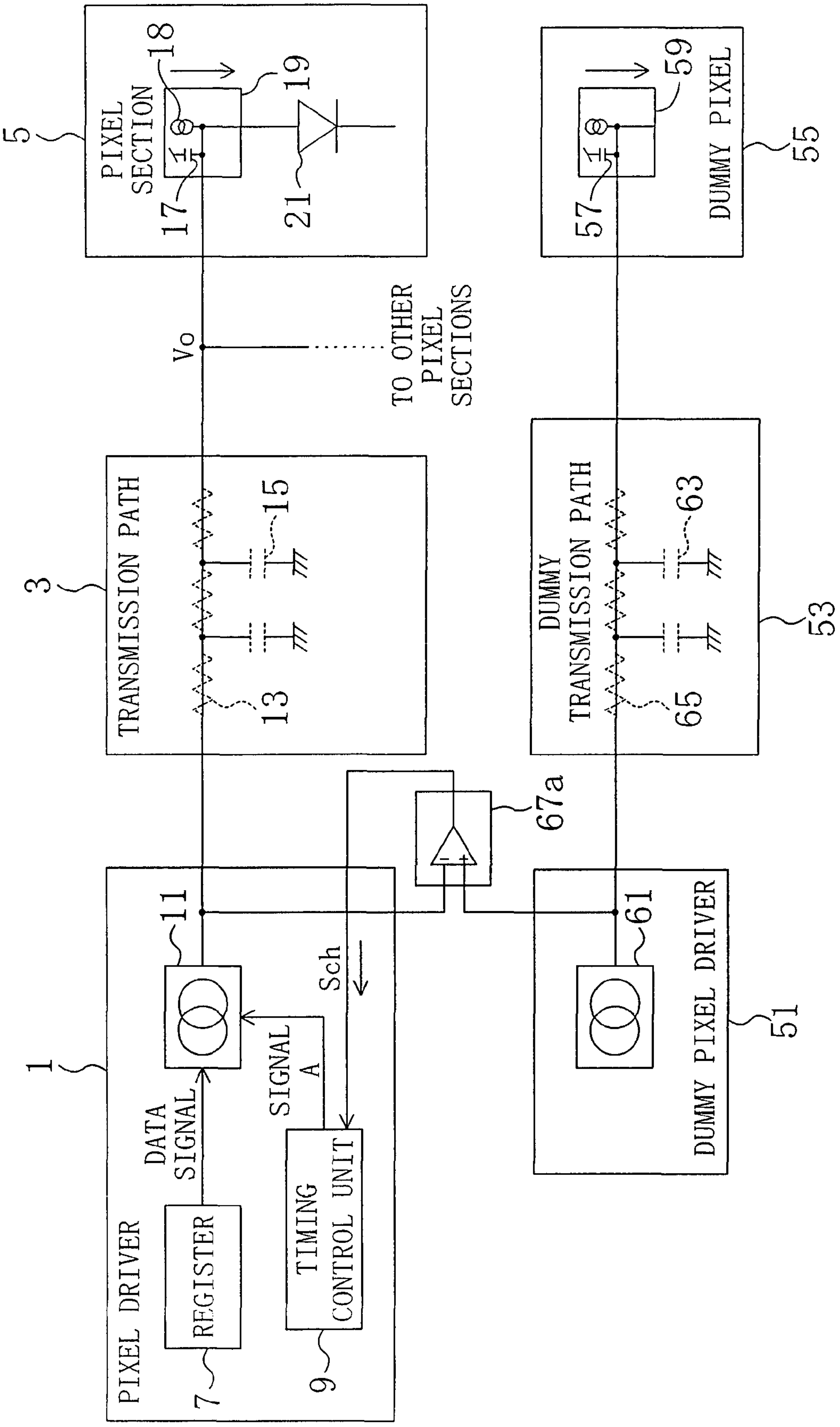
FIG. 11 is a circuit block diagram schematically showing a configuration of an organic EL display apparatus according to a specific example of the second embodiment.

FIG. 11 is a circuit block diagram schematically showing a configuration of the organic EL display apparatus according to the specific example of the second embodiment. In FIG. 11, each component also shown in FIG. 10 is identified by the same reference numeral.

As shown in FIG. 11, in the organic EL display apparatus of this specific example, the voltage setting means 50 shown in FIG. 10 further includes: a dummy pixel driver 51 having a dummy current driver 61; a dummy pixel section 55 provided on the display panel; and a dummy transmission path 53 through which an output current from the dummy current driver 61 is transmitted to the dummy pixel section 55. The "dummy" herein means being not directly related to an image display.

The dummy current driver 61 have the same configuration as that of the current driver 11 and includes a current mode D/A converter associated with 6 bits, in the case of a display apparatus producing a display of 64 levels of gray scale.

The dummy transmission path 53 have the same configuration as that of the transmission path 3 and includes a line connecting the source driver and the display panel to each other and signal lines provided on the panel. FIG. 11 also shows a wiring resistance 65 and a stray capacitance 63 on the dummy transmission path.

The dummy pixel section 55 includes a dummy current generator 59 including a dummy pixel input capacitance 57 and a power source and having the same configuration as that of the current generator 19. The organic EL device 21 is not necessarily provided.

In the organic EL display apparatus of this specific example, the output voltage of the dummy current driver 61 is input to a (+)-side input terminal of a comparator 67*a*. On the other hand, an output voltage of the current driver 11 is input to a (−)-side input terminal of the comparator 67*a*. The comparator 67*a* compares the output voltage of the current driver 11 with the output of the dummy current driver 61 and outputs the comparison result to the timing control unit 9. FIG. 11 shows the comparator including a differential amplifier as an example of the comparator, but another comparator having a different configuration may be used.

In this specific example, a constant current having an arbitrary value flows from the dummy pixel driver 51 during the periods other than a non-display mode.

For example, if the dummy pixel driver 51, the dummy transmission path 53 and the dummy pixel section 55 of this specific example are added to the organic EL display apparatus of the first specific example of the first embodiment shown in FIG. 3, a current equal to the current Ix flowing in the additional current source 24 is drawn into the dummy current driver 61. In this manner, the output voltage of the dummy current driver 61 changes to a stable output voltage at the output current Ix.

In the organic EL display apparatus of this specific example, the comparator 67*a* compares this stable output voltage with the output voltage of the current driver 11. In this case, in a current setting mode in which a low-luminance display is switched to a high-luminance display, if the output voltage of the current driver 11 is equal to or lower than the output voltage of the dummy current driver 61, the comparator 67*a* outputs the switching signal Sch to the timing control unit 9. On the other hand, in a current setting mode in which a high-luminance display is switched to a low-luminance display, if the output voltage of the current driver 11 is equal to or higher than the output voltage of the dummy current driver 61, the comparator 67*a* outputs the switching signal Sch to the timing control unit 9.

Since the comparator 67*a* operates in a transition period in which the voltage varies, the comparator 67*a* may compare V1 and kV2 (k is an arbitrary positive value) where V1 is the output voltage of the current driver 11 and V2 is the output voltage of the dummy current driver 61.

Upon the reception of the switching signal Sch, the timing control unit 9 has its operation reset so that the output current of the current driver 11 is switched to a set current according to a data signal.

In this manner, the output current from the current driver 11 is switched at an appropriate timing, so that it is possible to have the value of a current flowing in the pixel section 5 reach a target value in a shorter time than in a conventional apparatus.

In this specific example, the current flowing in the dummy current driver 61 is set at Ix, but may be set such that the stable output voltage of the dummy current driver 61 may be set lower or higher than the original stable output voltage of the current driver 11. Specifically, in the dummy pixel driver 51 of this specific example, the value of the current flowing in the dummy current driver 61 is arbitrarily set so that a charging period in which a high-luminance display is switched to a low-luminance display or a discharging period in which a low-luminance display is switched to a high-luminance display is minimized.

In an actual display apparatus, the optimum value of the output current from the dummy current driver 61 is obtained by, for example, actually measuring characteristics of a display panel.

In the organic EL display apparatus of this specific example, a set of the dummy pixel driver 51, dummy transmission path 53 and dummy pixel section 55 is preferably used in common to control a plurality of current drivers 11 in order to suppress the increase of the area.

In a case where the organic EL display apparatus has a relatively large display panel, the panel is often driven by a plurality of semiconductor chips in which source drivers are provided. In such a case, a plurality of semiconductor chips in which the dummy pixel drivers 51 are incorporated together with the source drivers are preferably arranged on the picture frame of the display panel. Then, the interval between the dummy transmission paths 53 and the interval between the dummy pixel sections 55 on the display panel are respectively set at given values (e.g., regular intervals), so that the influences of the characteristic variations of organic EL display pixel sections and transmission paths can be reduced. In addition, it is sufficient to use one type of chips on which the source drivers to be provided, thus simplifying the input and output configuration of the source drivers.

Not only this specific example, but also a case where a plurality of dummy transmission paths 53 and a plurality of dummy pixel sections 55 are provided on the display panel, it is preferable to arrange the dummy transmission paths 53 and the dummy pixel sections 55 at regular spacings.

If the dummy transmission paths 53 and the dummy pixel sections 55 are provided on a plurality of portions of the display panel as described above, the output voltages from output terminals of the dummy pixel drivers 51 (or output terminals of the dummy current drivers 61) connected to the respective dummy transmission paths 53 may be averaged so that the obtained average voltage be input to the comparator 67*a*. Then, the variations of organic EL display pixel sections and transmission paths 53 on the display panel are made even.

Embodiment 3

Figure 12:
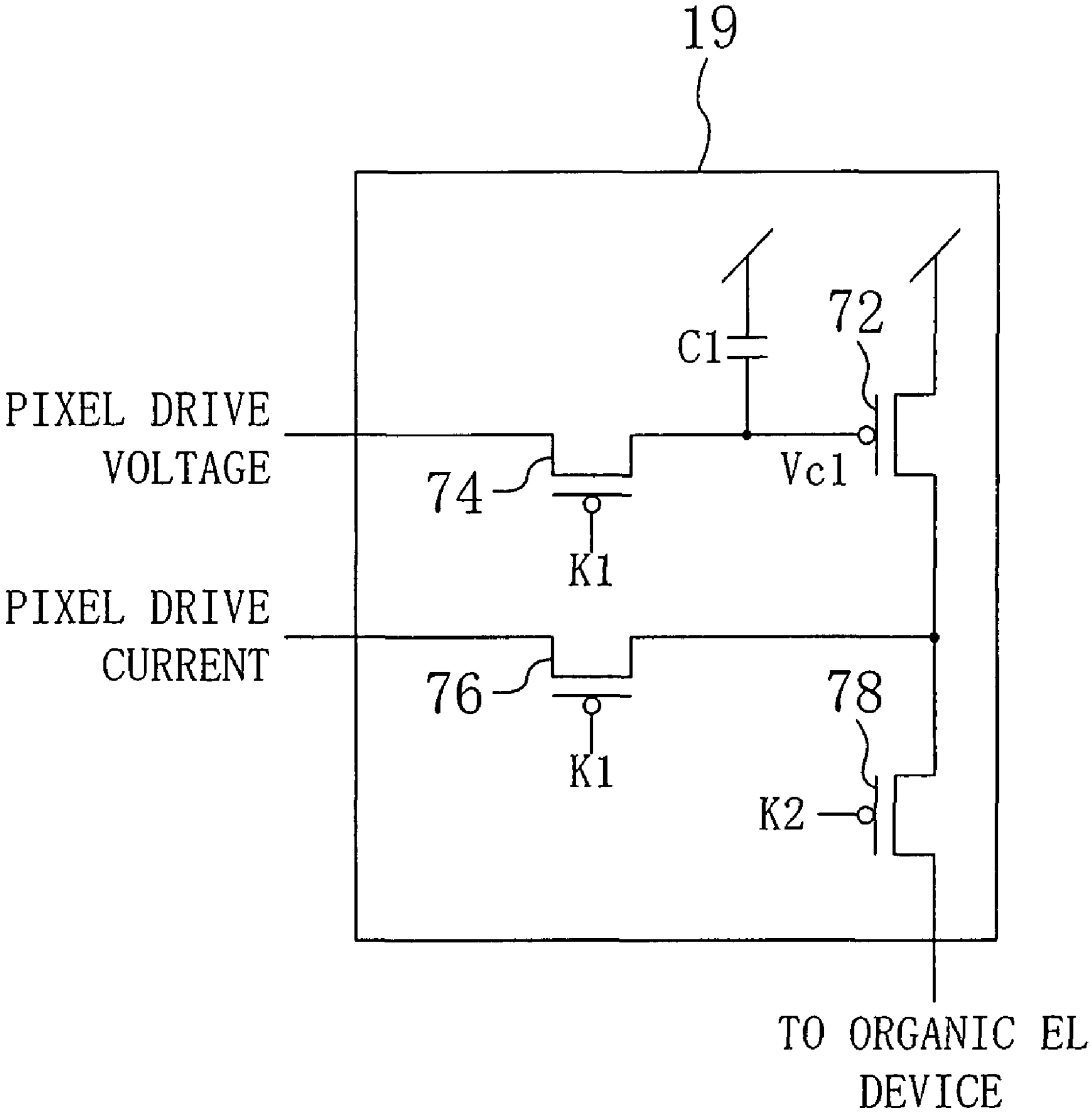
FIG. 12 is a circuit diagram showing a configuration of a current generator in an organic EL display apparatus according to a third embodiment of the present invention.
Figure 13:
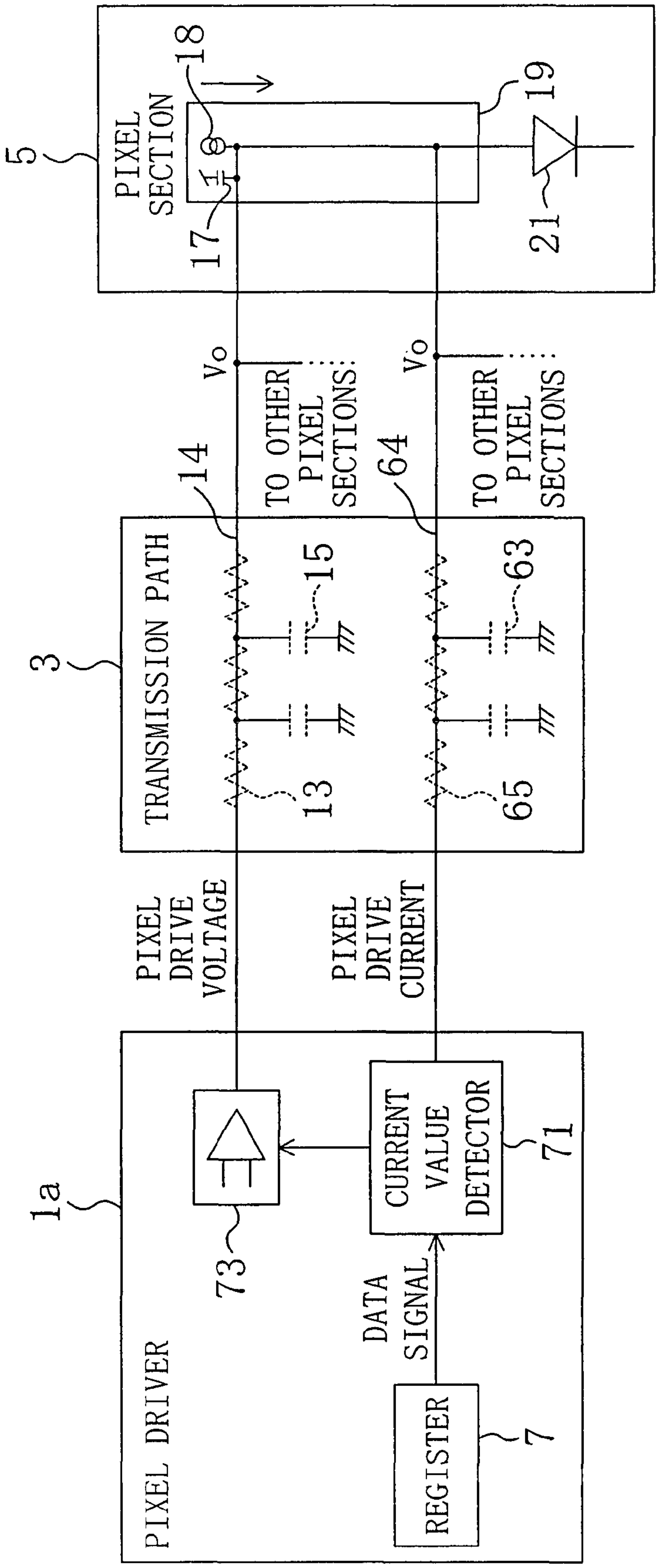
FIG. 13 is a circuit block diagram schematically showing an example of the organic EL display apparatus of the third embodiment using the current generator shown in FIG. 12.

FIG. 12 is a circuit diagram showing a configuration of a current generator according to a third embodiment of the present invention. FIG. 13 is a circuit block diagram schematically showing an example of an organic EL display apparatus according to the third embodiment using the current generator shown in FIG. 12.

As shown in FIG. 13, the organic EL display apparatus of this embodiment is characterized by including a voltage supplying means for supplying a drive voltage to a pixel section 5; and a current supplying means for supplying a drive current the pixel section 5. This current supplying means includes a current detecting means for feeding back the output voltage of the voltage supplying means.

Hereinafter, a specific configuration of the organic EL display apparatus of this embodiment will be described.

As shown in FIG. 13, the organic EL display apparatus of this embodiment includes: a display panel (not shown); a pixel section 5 provided on the display panel; a transmission path 3 connected to the pixel section 5; and a pixel driver 1*a* included in a source driver and used for supplying a drive voltage and a drive current to the pixel section 5 via the transmission path 3.

The pixel driver 1*a* includes: a voltage driver 73 for supplying a drive voltage to the pixel section 5; and a current value detector 71 for setting a drive current flowing in the pixel section 5 and for detecting the value of the drive current and outputting the detection result to the voltage driver 73; and a register 7 for latching a data signal as image data and outputting the data signal to the current value detector 71.

The transmission path 3 includes: a line and a drive-voltage signal line 14 which are used for transmitting the drive voltage to the pixel section 5; and a line and a drive-current signal line 64 which are used for transmitting the drive current to the pixel section 5.

The pixel section 5 includes: an organic EL device 21 for emitting light in accordance with an input current; and a current generator 19 connected to the voltage driver 73 and the current value detector 71 via the transmission path 3 and used for supplying a drive current to the organic EL device 21.

As shown in FIG. 12, the current generator 19 includes: a p-channel TFT 72 whose gate electrode is connected to the drive-voltage signal line 14, whose source receives a power-supply voltage and which is used for supplying the drive current to the organic EL device 21; a capacitance C1 connected to the gate electrode of the TFT 72 at one terminal and used for holding a gate voltage Vc1; and a first switching transistor 74 (switch for voltage) provided on a connection path connecting the capacitance C1 and the gate electrode of the TFT 72 to the drive-voltage signal line 14 and controlled with a first control signal K1; and a second switching transistor 78 interposed between the TFT 72 and the organic EL device 21 and controlled with a second control signal K2, which is a signal of opposite phase to that of the first control signal K1. In the current generator 19, the connection point between the TFT 72 and the second switching transistor 78 is connected to the drive-current signal line 64, and a third switching transistor 76 (switch for current) controlled with the control signal K1 is interposed between the TFT 72 or the second switching transistor 78 and the drive-current signal line 64. These switching MOS transistors are all p-channel TFTs, but may be any devices as long as they are capable of switching operation. The capacitance C1 and the TFT 72 shown in FIG. 12 correspond to the pixel input capacitance 17 and the current source 18 shown in FIG. 13, respectively.

Now, it will be described how the current generator 19 operates.

First, in a current setting mode, with the control signals K1 and K2, the first and third switching transistors 74 and 76 are turned ON and the second switching transistor 78 is turned OFF. This causes a pixel drive voltage to be supplied from the voltage driver 73 to the capacitance C1 and the gate electrode of the TFT 72 via the first switching transistor 74, and a pixel drive current flows into the TFT 72 via the third switching transistor 76. When the capacitance C1 is charged in an amount corresponding to the gate voltage Vc1 in this current setting mode, a constant current (a target current Ita) begins to flow into the TFT 72.

Then, in a display mode, with the control signals K1 and K2, the first and third switching transistors 74 and 76 are OFF and the second switching transistor 78 is ON. In this period, the charged capacitance C1 holds the gate voltage Vc1, so that the target current Ita continuously flows from the TFT 72 into the organic EL device 21.

Now, operation and characteristics of the current driver 1*a* of this embodiment will be described briefly.

In the conventional organic EL display apparatus, a capacitance is charged by a power-supply voltage via a TFT in the pixel section 5 when a low-luminance display is switched to a high-luminance display. However, since the TFT has a high output impedance, the pixel input capacitance 17 cannot be charged at high speed in the conventional apparatus.

In contrast, in the organic EL display apparatus of this embodiment, the pixel drive voltage is supplied from the voltage driver 73 to the pixel section 5 via the drive-voltage signal line 14 in a current setting mode. In this period, the output impedance of the voltage driver 73 is lower than that of the current driver in the conventional organic EL display apparatus. Accordingly, in the organic EL display apparatus of this embodiment, the pixel input capacitance 17 (capacitance C1) is charged at higher speed than in the conventional organic EL display apparatus.

In the current setting mode, the current value detector 71 detects the value of the current flowing from the pixel section 5 via the drive-current signal line 64 and feeds back the detection result to the voltage driver 73.

Figure 14:
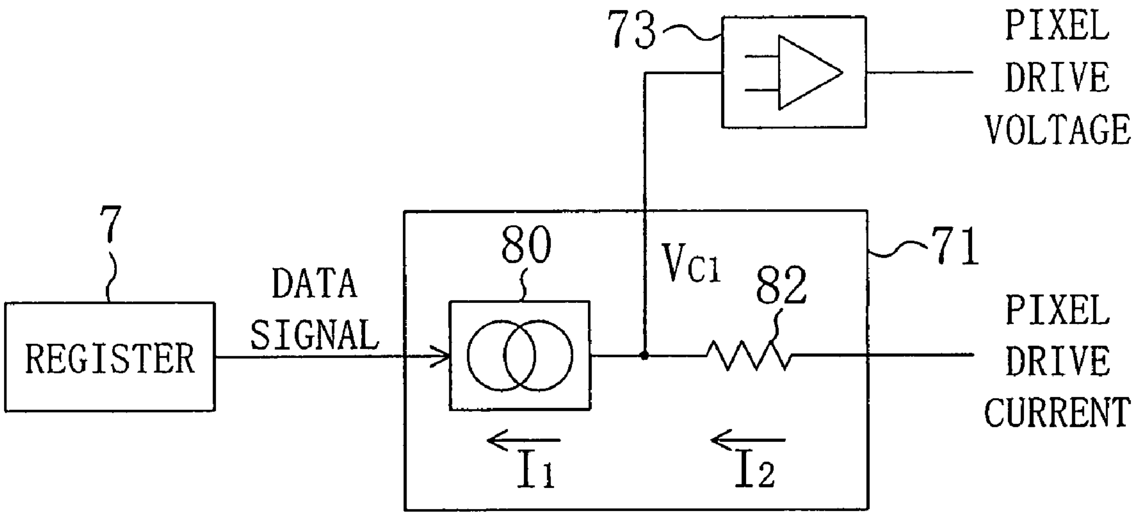
FIG. 14 is a circuit block diagram showing an example of a configuration of the current value detector in the organic EL display apparatus of the third embodiment.

FIG. 14 is a circuit block diagram showing an example of a configuration of the current value detector 71 used in the organic EL display apparatus of this embodiment.

The current value detector 71 shown in FIG. 14 includes: a current driver 80 for receiving a data signal output from the register 7 and allowing a drive current from the pixel section 5 to flow; and a resistance 82 provided between the pixel section 5 and the current driver 80. The line connecting the current driver 80 and the resistance 82 to each other is connected to the voltage driver 73.

In the current value detector 71, suppose $I_1$ is a drive current set according to a data signal from the register 7 and $I_2$ is a pixel drive current flowing from the pixel section 5, a voltage Vc1 output from the current value detector 71 to the voltage driver 73 is stabilized when the drive current $I_1$ and the pixel drive current $I_2$ are equal to each other. If the pixel drive current $I_2$ is larger than the drive current $I_1$ the voltage Vc1 rises and the pixel drive current $I_2$ decreases. If the drive current $I_1$ is larger than the pixel drive current $I_2$, feedback is produced such that the voltage Vc1 drops and the pixel drive current $I_2$ increases. As a result, the pixel drive voltage output from the voltage driver 73 is stabilized at an appropriate value. In this case, since the pixel input capacitance 17 is not present on a transmission path of the pixel drive current $I_2$, the stray capacitance of the entire transmission path is small, so that the current value can be detected at high speed. Accordingly, in the organic EL display apparatus of this embodiment, the values of the current and voltage supplied to the pixel section 5 reach respective target values in a shorter time than in a conventional apparatus, thus allowing a display with higher accuracy.

The current value detector 71 is not limited to the configuration shown in FIG. 14 as long as the pixel drive current from the pixel section 5 is detected and fed back to the voltage driver 73.

The current value detector 71 of this embodiment is adopted in a case where the current source 18 on the display panel is composed of p-channel TFTs. In a case where the current source 18 is composed of n-channel TFTs, it is sufficient that the current value detector 71 is configured such that the output voltage to the voltage driver 73 decreases as the pixel drive current increases.

In this embodiment, the current generator 19 has a configuration as shown in FIG. 12. Alternatively, the configuration thereof is not limited to that shown in FIG. 12 as long as the drive current is output to the organic EL device 21 by the inputs of the pixel drive voltage and the pixel drive current.

Embodiment 4

Figure 15:
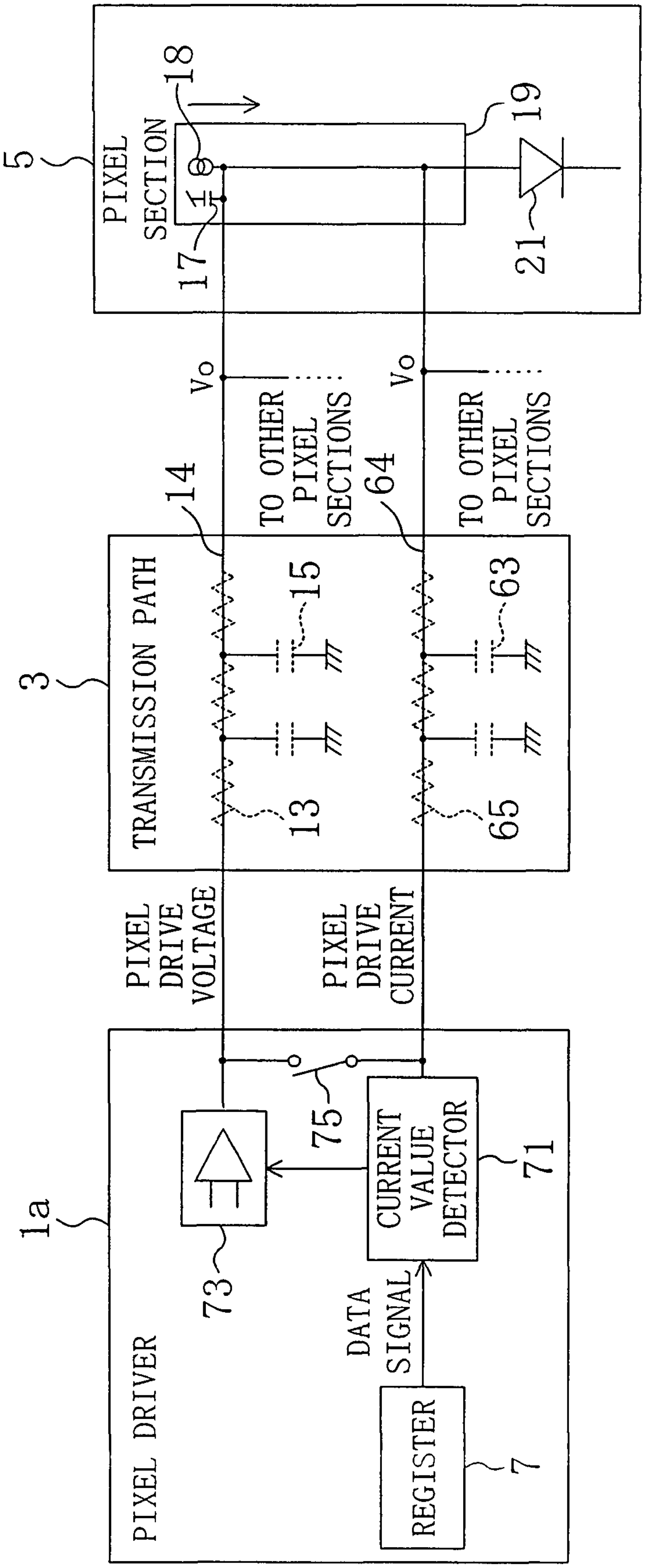
FIG. 15 is a circuit block diagram schematically showing an example of an organic EL display apparatus according to a fourth embodiment of the present invention.

FIG. 15 is a circuit block diagram schematically showing an example of an organic EL display apparatus according to a fourth embodiment of the present invention.

As shown in FIG. 15, as the organic EL display apparatus of the fourth embodiment, the organic EL display apparatus of the third embodiment further includes a short-circuit means for making a short circuit between an output terminal of a voltage driver 73 and an output terminal of a current value detector 71 only during a given period. The other elements are the same as those of the organic EL display apparatus of the third embodiment, and thus the descriptions thereof will be herein omitted.

In the example shown in FIG. 15, a switch 75 electrically connects the output terminal of the voltage driver 73 and the output terminal of the current value detector 71 to each other only during a given period when the outputs of an image drive voltage and a pixel drive current start (at the beginning of a current setting mode). As the switch 75, a transfer gate composed of an nMOSFET and a pMOSFET, for example, is used. However, other configurations may be adopted. The switch 75 may be provided between signal lines on a display panel, but is preferably provided on a chip on which a source driver is provided.

In the organic EL display apparatus of this embodiment, the voltage driver 73 has a low output impedance as in the organic EL display apparatus of the third embodiment. Accordingly, a pixel input capacitance 17 can be charged at high speed. In addition, since the pixel input capacitance 17 is not provided on a transmission path of the pixel drive current, the current value detector 71 detects a current value at high speed.

In particular, in the organic EL display apparatus of this embodiment, the output terminal of the current value detector 71 and the output terminal of the voltage driver 73 having a low output impedance are short-circuited during the given period, so that the current value can be detected at higher speed. Accordingly, the organic EL display apparatus of this embodiment allows the values of the pixel drive current and the pixel drive voltage to reach respective target values more rapidly than in the organic EL display apparatus of the third embodiment.

Embodiment 5

Figure 16:
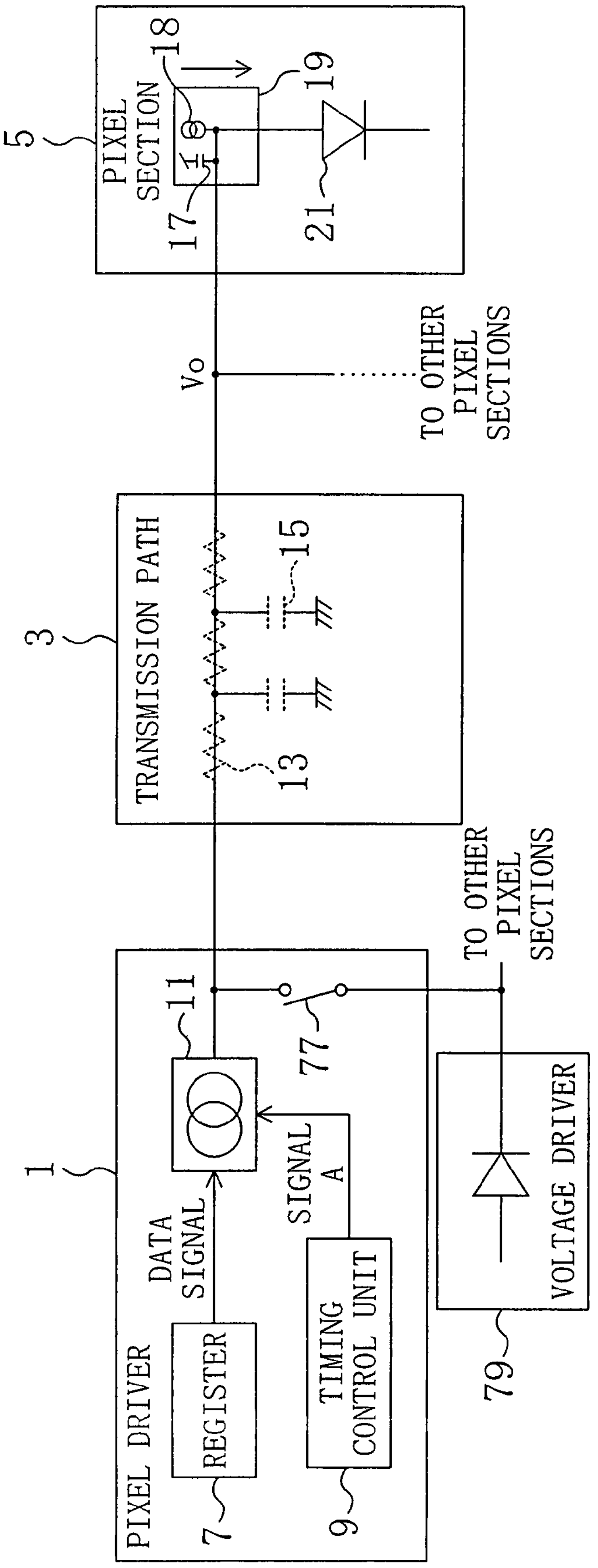
FIG. 16 is a circuit block diagram schematically showing a configuration of an organic EL display apparatus according to a fifth embodiment of the present invention.

FIG. 16 is a circuit block diagram schematically showing a configuration of an organic EL display apparatus according to a fifth embodiment of the present invention.

As the organic EL display apparatus of this embodiment, the organic EL display apparatus of the first embodiment shown in FIG. 1 further includes a low-impedance means having a low output impedance, e.g., a voltage supplying means such as a voltage driver 79. The voltage driver 79 may be a buffer for amplifying current connected to another voltage source. The descriptions of the same components as those in the organic EL display apparatus of the first embodiment will be herein omitted.

As shown in FIG. 16, the organic EL display apparatus of this embodiment is different from the organic EL display apparatus of the first embodiment in that the voltage driver 79 for outputting a constant voltage with an arbitrary value and a switch 77 provided on a line connecting an output terminal of the voltage driver 79 and an output terminal of a current driver 11 to each other are provided and that the switch 77 is controlled with a signal A output from a timing control unit 9.

The switch 77 is ON with the signal A only during a given period in a current setting mode. When the switch 77 turns OFF, the current driver 11 outputs a current which has been set according to a data signal.

Accordingly, in the organic EL display apparatus of this embodiment, after the current setting mode in which a high-luminance (white) display is switched to a low-luminance (black) display has started, a stray capacitance 15 and a pixel input capacitance 17 are charged rapidly using the voltage driver 79 having a low output impedance. As a result, the current flowing in the pixel section 5 reaches a target value in a shorter time than in a conventional apparatus.

In addition, in a current setting mode in which a low-luminance display is switched to a high-luminance display, the charge held in the stray capacitance 15 or the pixel input capacitance 17 is released rapidly, so that the current flowing in the pixel section 5 also reaches the target value in a shorter time than in the conventional apparatus.

Accordingly, in both cases where a high-luminance display is switched to a low-luminance display and where low-luminance display is switched to a high-luminance display, the value of the current flowing in a pixel section reaches a target value in a short time, thus implementing a display with higher resolution than in the conventional apparatus.

The voltage driver 79 described above may be provided to every pixel driver 1, or may be connected to a plurality of pixel drivers 1. When area reduction is paramount, one voltage driver 79 is preferably provided to a plurality of pixel drivers 1.

Embodiment 6

Figure 17:
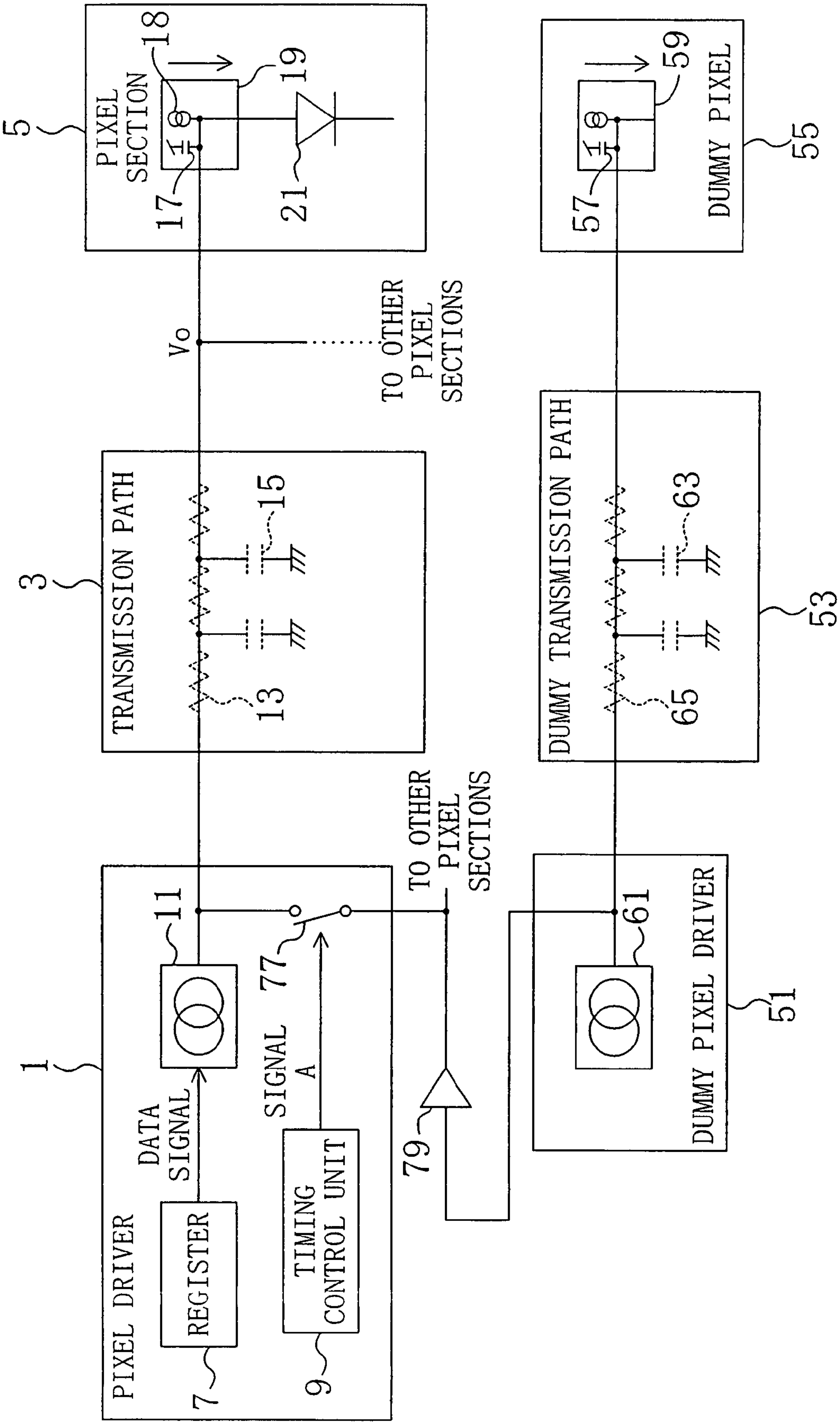
FIG. 17 is a circuit block diagram schematically showing a configuration of an organic EL display apparatus according to a sixth embodiment of the present invention.

FIG. 17 is a circuit block diagram schematically showing a configuration of an organic EL display apparatus according to a sixth embodiment of the present invention.

As shown in FIG. 17, as the organic EL display apparatus of this embodiment, the organic EL display apparatus of the fifth embodiment further includes the dummy pixel driver 51, the dummy transmission path 53 and the dummy pixel section 55 shown in FIG. 11. An output terminal of the dummy pixel driver 51 is connected to an input terminal of the voltage driver 79. The voltage driver 79 is, for example, a buffer for amplifying current and supplies the output voltage of the dummy pixel driver 51 when the switch 77 is ON. The switch 77 is ON only during a given period in a current setting mode.

In this manner, the output voltage of the dummy pixel driver 51 is supplied to the pixel section 5 via the transmission path 3 during the given period in the current setting mode. During this period, the output impedance of the voltage driver 79 is low, so that charging of a stray capacitance 15 and a pixel input capacitance 17 and discharging of the stray capacitance 15 and the pixel input capacitance 17 are completed rapidly. Thereafter, the switch 77 turns OFF, so that a current which has been set according to a data signal flows from the current driver 11.

Since the organic EL display apparatus of this embodiment is provided with the dummy pixel driver 51, the dummy transmission path 53 and the dummy pixel section 55 which are not directly related to an image display, the output voltage close to an actual stable output voltage is supplied independently of the characteristics of the display panel which is used. In other words, it is unnecessary to set the output voltage of the voltage driver 79 for every display panel.

In addition, the dummy pixel driver 51 is capable of supplying a voltage to pixel sections connected to a plurality of signal lines, so that increase of the circuit area can be suppressed, as compared to a case where the dummy pixel driver 51 is provided to every pixel driver 1.

Embodiment 7

As an organic EL display apparatus according to a seventh embodiment of the present invention, the organic EL display apparatus of the fifth embodiment shown in FIG. 16 uses a DAC means 123 as the voltage driver 79, and the DAC means 123 is provided to every pixel driver 1.

Figures 18A, 18B:
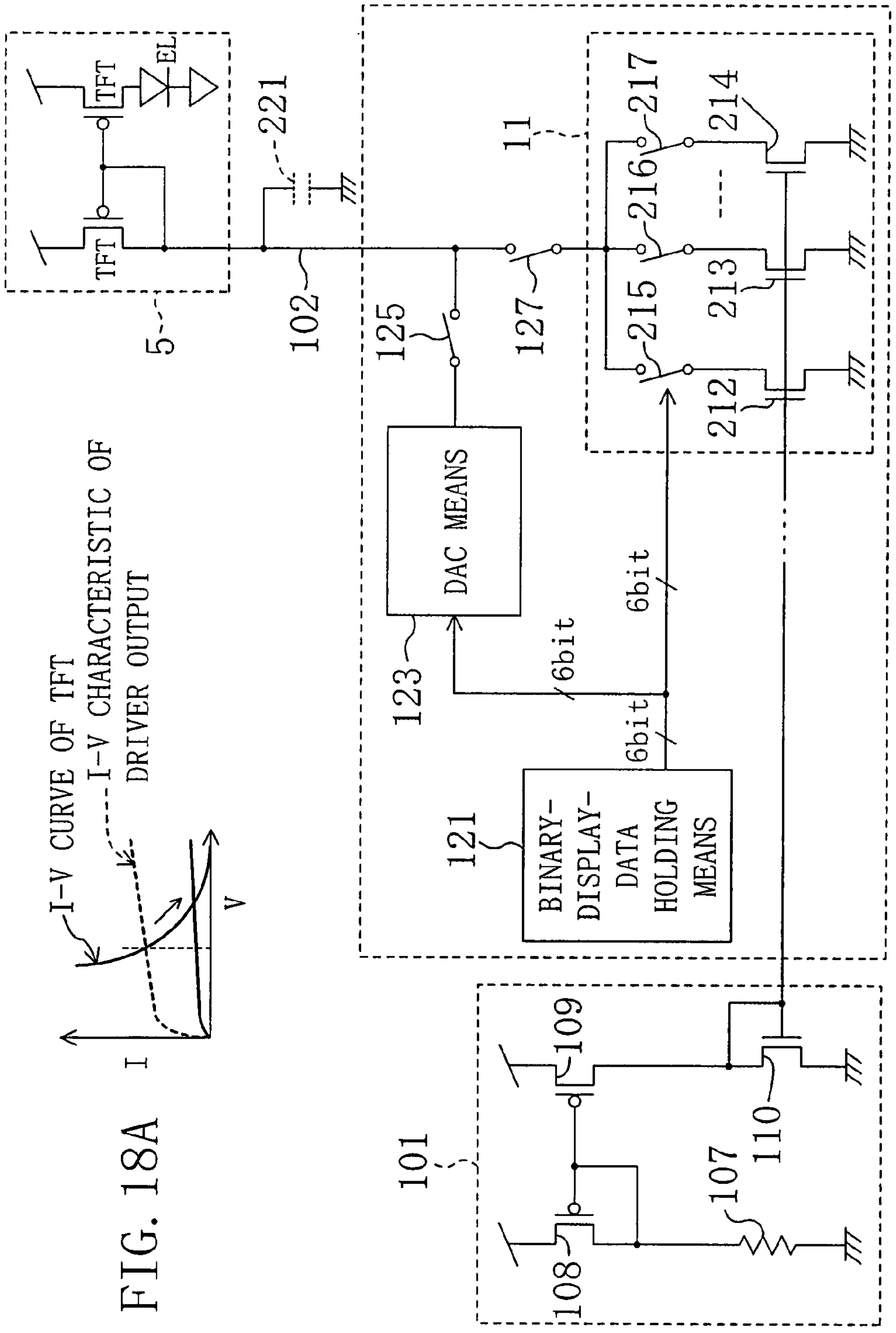
FIG. 18A is a graph showing an operating point of a TFT in a white display mode (high-luminance display mode) in an organic EL display apparatus according to a seventh embodiment of the present invention.
FIG. 18B is a circuit block diagram showing a configuration of the organic EL display apparatus of the seventh embodiment.

FIG. 18A is a graph showing an operating point of a TFT in a white display mode (high-luminance display mode) in the organic EL display apparatus of the seventh embodiment. FIG. 18B is a circuit block diagram showing a configuration of the organic EL display apparatus of the seventh embodiment.

As shown in FIG. 18B, the organic EL display apparatus of the seventh embodiment includes: a display panel provided with a pixel section 5 including TFTs and an organic EL device and with a signal line 102 connected to the pixel section 5; and a source driver (not shown) for supplying a drive current to the pixel section 5.

The source driver includes: a current driver 11 for causing a drive current to flow into the pixel section 5; a switch 127 for turning ON or OFF the drive current from the current driver 11; the voltage-output DAC means 123 whose output terminal is connected to a connection path between the current driver 11 and the pixel section 5; a binary-display-data holding means 121 for latching a data signal which is an image signal; a switch 125 for turning ON or OFF the output voltage of the DAC means 123; and a reference current generator 101. The binary-display-data holding means 121 corresponds to the register 7 shown in FIG. 16.

In the case of a gray scale display corresponding to N bits, the current driver 11 has N current sources. Since a 6-bit gray scale display is produced in this embodiment, the current driver 11 includes: a first current source 212; a second current source 213; . . . ; a sixth current source 214; and a first switch 215; a second switch 216; . . . ; and a sixth switch 217. The first switch 215, the second switch 216, . . . and the sixth switch 217 are used for turning ON or OFF the outputs of the first current source 212, the second current source 213, . . . , and the sixth current source 214, respectively.

The binary-display-data holding means 121 outputs a 6-bit data signal to each of the DAC means 123, the first switch 215, the second switch 216, . . . , and the sixth switch 217.

The reference current generator 101 includes: a first pMOSFET 108; a resistance 107 connected to the first MOSFET 108 and used for generating a reference current; a second MOSFET 109 forming a current mirror together with the first MOSFET 108; and a third nMOSFET 110 for transmitting a current flowing in the second MOSFET 109 to the first current source 212, the second current source 213, . . . , and sixth current source 214. Each of the nMOSFETs constituting the respective first current source 212, second current source 213, . . . , and sixth current source 214 forms a current mirror circuit together with the third MOSFET 110.

The organic EL display apparatus of this embodiment is characterized by including the DAC means 123 disposed near the final operating point of the source driver and outputting a voltage according to a 6-bit data signal. The switch 125 is ON only during a given period in a current setting mode. During the given period, the output voltage of the DAC means 123 is supplied to the pixel section 5. This given period is set such that the current flowing in the pixel section 5 is approximately a target current.

The output of the DAC means 123 has an impedance much lower than that of the current driver 11, so that a stray capacitance 221 (the stray capacitance 15 shown in FIG. 16) and a pixel input capacitance on a transmission path are charged in a shorter time than in a conventional apparatus, when a high-luminance display is switched to a low-luminance display. In this period, the current-voltage capacitance of the source driver output shifts from the dotted curve to the solid curve shown in FIG. 18A and the operating point of the TFT in the pixel section 5 shifts to higher voltages. Accordingly, the switching to the high-luminance display can be achieved in a short time. As a result, even if a high-resolution panel is used, the organic EL display apparatus of this embodiment can display an image excellently.

The DAC means 123 of this embodiment is capable of outputting a voltage according to respective data items for a display of 64 levels of gray scale, so that the value of the current flowing in the pixel section 5 reaches a target value in a shorter time. Examples of the voltage according to the data items for the display of 64 levels of gray scale include a stable output voltage on the display data items with respect to the display data.

In the organic EL display apparatus of this embodiment, the DAC means 123 provided on the chip on which the source driver is provided is used as a low impedance means. Alternatively, the organic EL display apparatus of this embodiment may have a configuration in which a power-supply voltage from the outside is supplied to the pixel section 5 only during a given period in the current setting mode.

Embodiment 8

Figure 19:
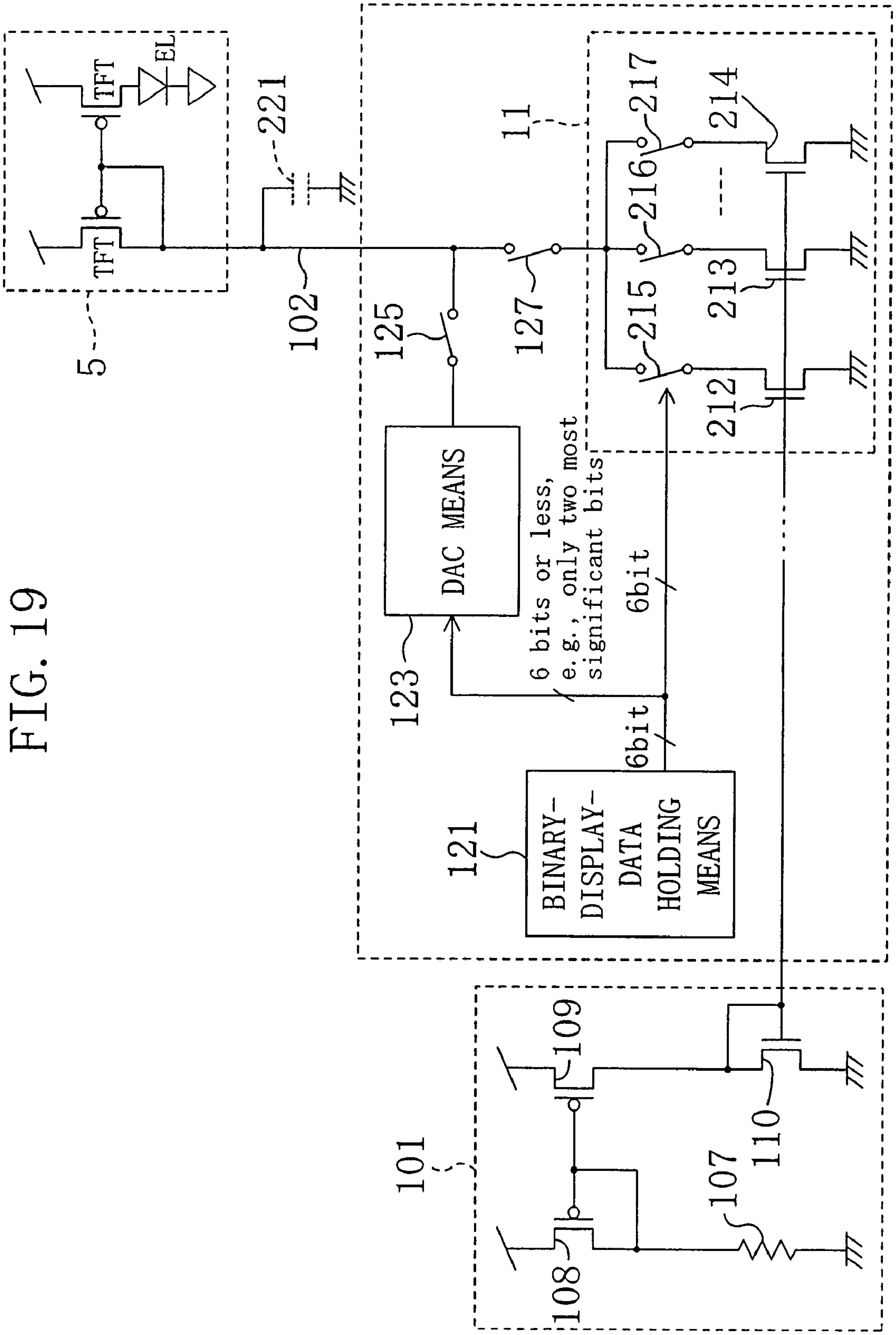
FIG. 19 is a circuit block diagram showing a configuration of an organic EL display apparatus according to an eighth embodiment of the present invention.

FIG. 19 is a circuit block diagram showing a configuration of an organic EL display apparatus according to an eighth embodiment of the present invention.

As shown in FIG. 19, the organic EL display apparatus of this embodiment is different from the organic EL display apparatus of the seventh embodiment in that a data signal having only some of the bits of the 6-bit data signal is output from a binary-display-data holding means 121 to a DAC means 123. The other part of the circuit configuration is the same as in the seventh embodiment, and the description thereof will be omitted herein.

Since a voltage corresponding to, for example, the two most significant bits is output from the DAC means 123 of this embodiment, a current setting mode in which a high-luminance display is switched to a low-luminance display is shorter than in a conventional apparatus. In particular, the DAC means 123 of this embodiment has a smaller circuit area than that of the DAC means of the seventh embodiment, so that the DAC means 123 of this embodiment is preferable when area reduction of the display apparatus is required. Note that the DAC means of the seventh embodiment is capable of outputting optimum voltages with respect to the data signals corresponding to all the levels of gray scale, so that the DAC means of the seventh embodiment is preferable when the improvement of resolution is important more than the area reduction.

The data signal to be input to the DAC means 123 of this embodiment preferably is a higher-order bit signal rather than a lower-order bit signal because the higher-order bit signal allows a more appropriate voltage to be output than in the case of the lower-order bit signal.

Embodiment 9

Figures 20A, 20B:
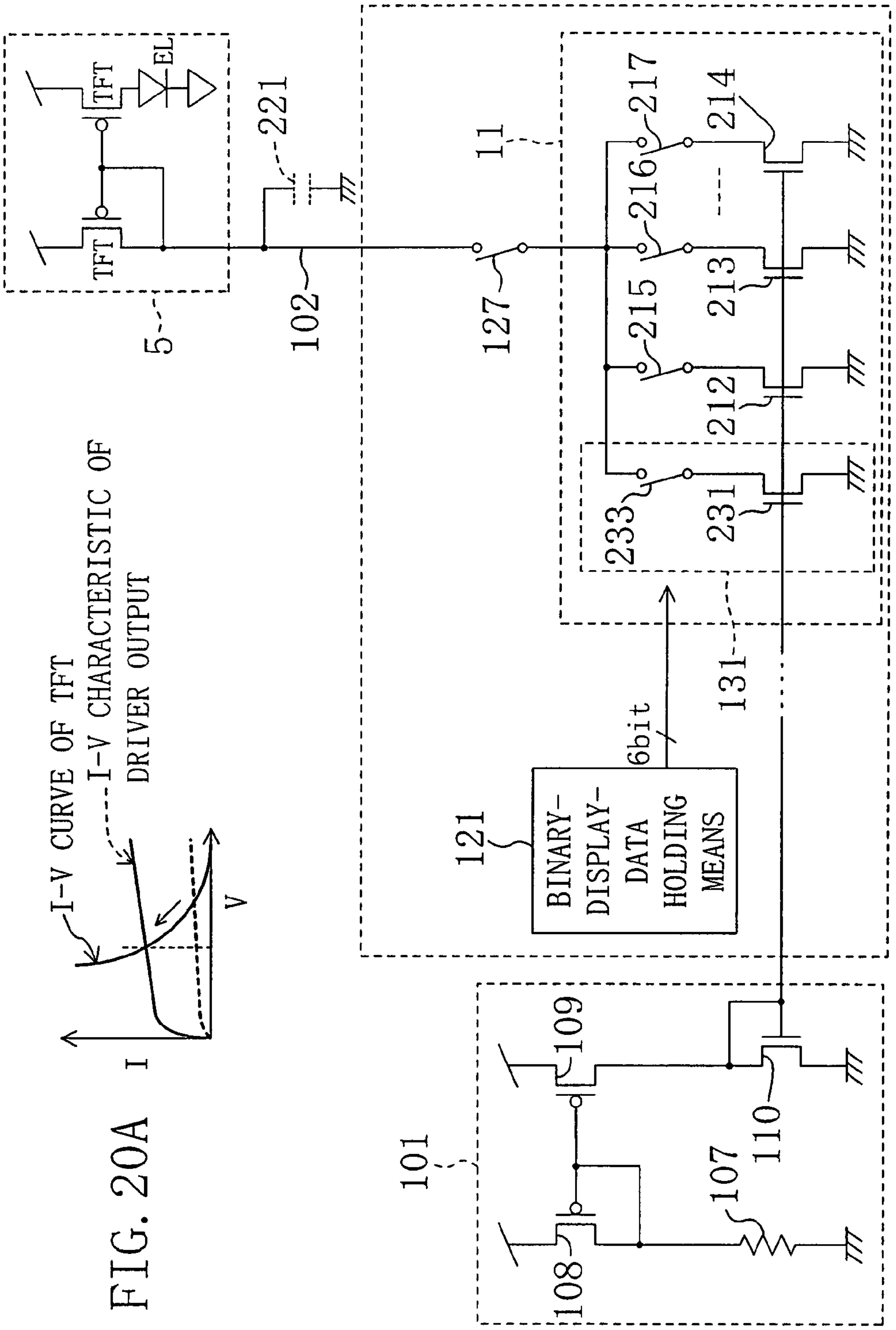
FIG. 20A is a graph showing an operating point of a TFT in a black display mode (low-luminance display mode) in an organic EL display apparatus according to a ninth embodiment of the present invention.
FIG. 20B is a circuit block diagram showing a configuration of the organic EL display apparatus of the ninth embodiment.

FIG. 20A is a graph showing an operating point of a TFT in a black display mode (low-luminance display mode) in an organic EL display apparatus according to a ninth embodiment of the present invention. FIG. 20B is a circuit block diagram showing a configuration of the organic EL display apparatus of the ninth embodiment.

The organic EL display apparatus of this embodiment is characterized in that a redundancy bit section 131 for outputting a current Ix to a current driver 11 is added. The redundancy bit section 131 includes: an additional current source 231 forming current mirrors together with a first current source 212, a second current source 213, . . . , a sixth current source 214 and a third MOSFET 110; and a switch 233 for allowing a current output from the additional current source 231 to flow during a given period in a current setting mode.

The organic EL display apparatus of this embodiment is a modified example of the first specific example of organic EL display apparatus of the first embodiment shown in FIGS. 1 and 3.

Specifically, in the redundancy bit section 131 shown in FIG. 20B, the additional current source 231 corresponds to the additional current source 24 shown in FIG. 3 and the switch 233 corresponds to the switch $SW_A$ also shown in FIG. 3. The switch $SW_A$ is controlled by a timing control unit 9 not shown in FIG. 20B such that the switch $SW_A$ is ON only during a given period in a current setting mode. The value of a current flowing in the additional current source 231 while the switch $SW_A$ is ON is larger than at least the minimum current unit, and more particularly, than a current value originally set with a data signal.

In this manner, the output impedance with respect to the panel is reduced in the current setting mode in which a low-luminance display is switched to a high-luminance display, thus allowing the value of the current flowing in the pixel section 5 to reach a target value in a shorter time than in a conventional apparatus. In a low-luminance display mode, the operating point of the TFT in the pixel section 5 shifts to lower potentials as shown in FIG. 20A.

The redundancy bit section 131 of this embodiment is capable of changing the amount of a current drawn depending on a 6-bit data signal output from the binary-display-data holding means 121. The amount of the drawn current may be independent of the data signal.

In this manner, the organic EL display apparatus of this embodiment allows the value of the current flowing in the pixel section 5 to reach a target value in a shorter time than in the first specific example of the first embodiment. Accordingly, the organic EL display apparatus of this embodiment achieves a high-resolution image display.

Embodiment 10

Figure 21:
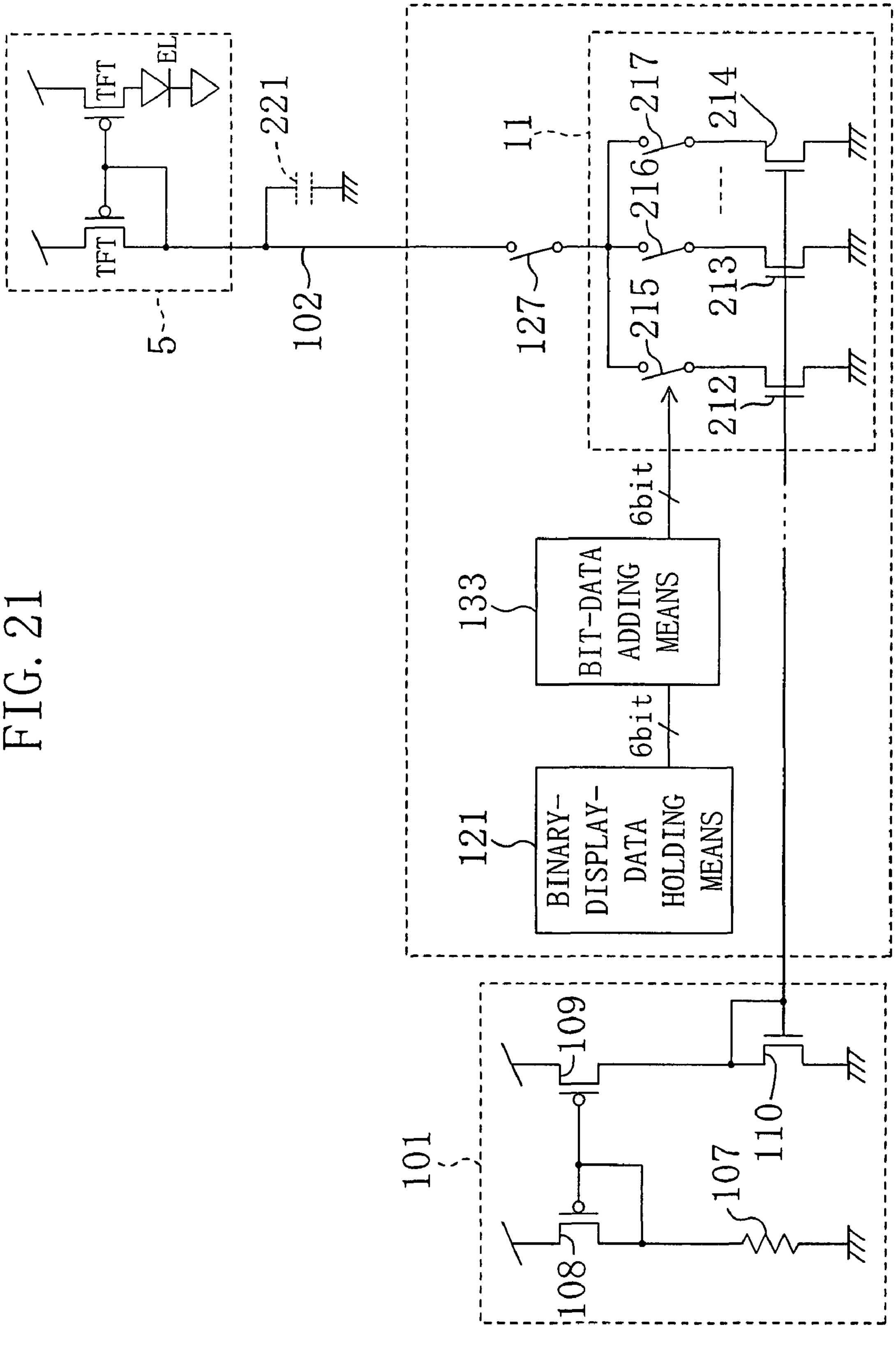
FIG. 21 is a block circuit diagram showing a configuration of an organic EL display apparatus according to a tenth embodiment of the present invention.

FIG. 21 is a block circuit diagram showing a configuration of an organic EL display apparatus according to a tenth embodiment of the present invention.

Figures 24A, 24B, 24C, 24D:
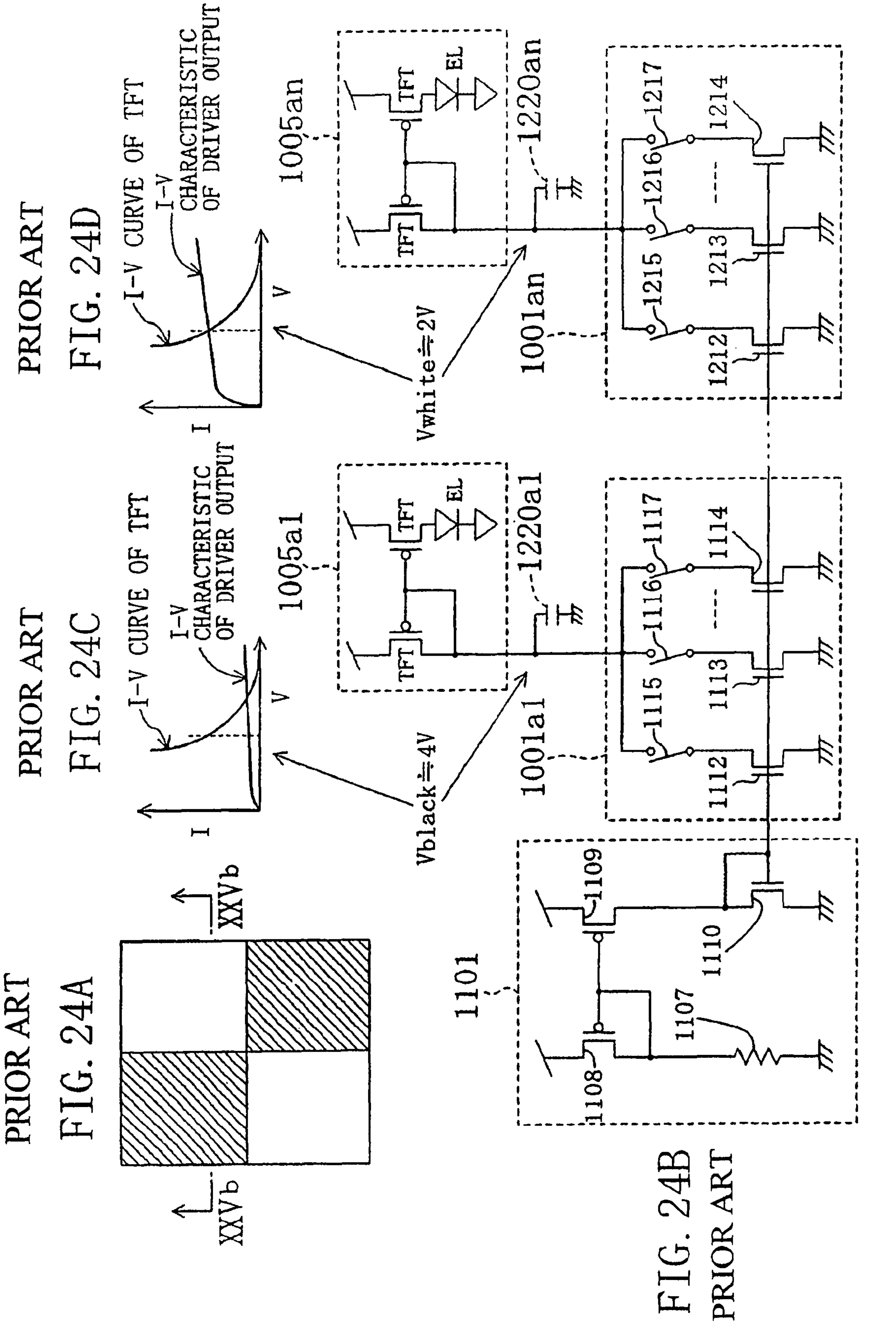
PRIOR ART FIG. 24A
FIG. 24B PRIOR ART
PRIOR ART FIG. 24C
PRIOR ART FIG. 24D
FIG. 24A is an enlarged view showing a display panel in a case of a black and white display in the conventional organic EL display apparatus.
FIG. 24B is a circuit diagram showing pixel sections arranged on the XXVb-XXVb line on the display panel shown in FIG. 24A and pixel drivers connected to the respective pixel sections.
FIG. 24C is a graph showing an operating point of a TFT in a black display mode.
FIG. 24D is a graph showing an operating point of the TFT in a white display mode.

As the organic EL display apparatus of this embodiment, the conventional organic EL display apparatus shown in FIG. 24 further includes a binary-display-data holding means 121 for latching and outputting a data signal which is image data; a bit-data adding means 133 for adding a bit/bits to the data signal and outputting the result. In the example shown in FIG. 21, the data signal output from the binary-display-data holding means 121 has 6 bits.

The number of bits added to the data signal by the bit-data adding means 133 according to this embodiment may be arbitrarily set, but is preferably one or two in order to suppress the increases of power consumption and the increase of the circuit area.

The current driver 11 is capable of outputting a current to which bits have been added. For example, if the bit-data adding means 133 adds two bits to the data signal, current sources and switches associated with the two least significant bits are further added to the current driver 11.

In the organic EL display apparatus of this embodiment, if the binary-display-data holding means 121 adds two bits to the 6-bit data signal and outputs the resultant data signal to the current driver 11 in a current setting mode, a current to which the two bits have been temporarily added is drawn into the current driver 11. In this manner, a stray capacitance and a pixel input capacitance on a panel are discharged rapidly. As a result, it is possible to have the value of the current flowing in the pixel section 5 reach a target value in a shorter time than in a conventional apparatus.

Although not shown in FIG. 21, the bit-data adding means 133 of this embodiment is driven by, for example, a timing control unit as shown in FIG. 9 only during a given period in the current setting mode.

Embodiment 11

Figure 22:
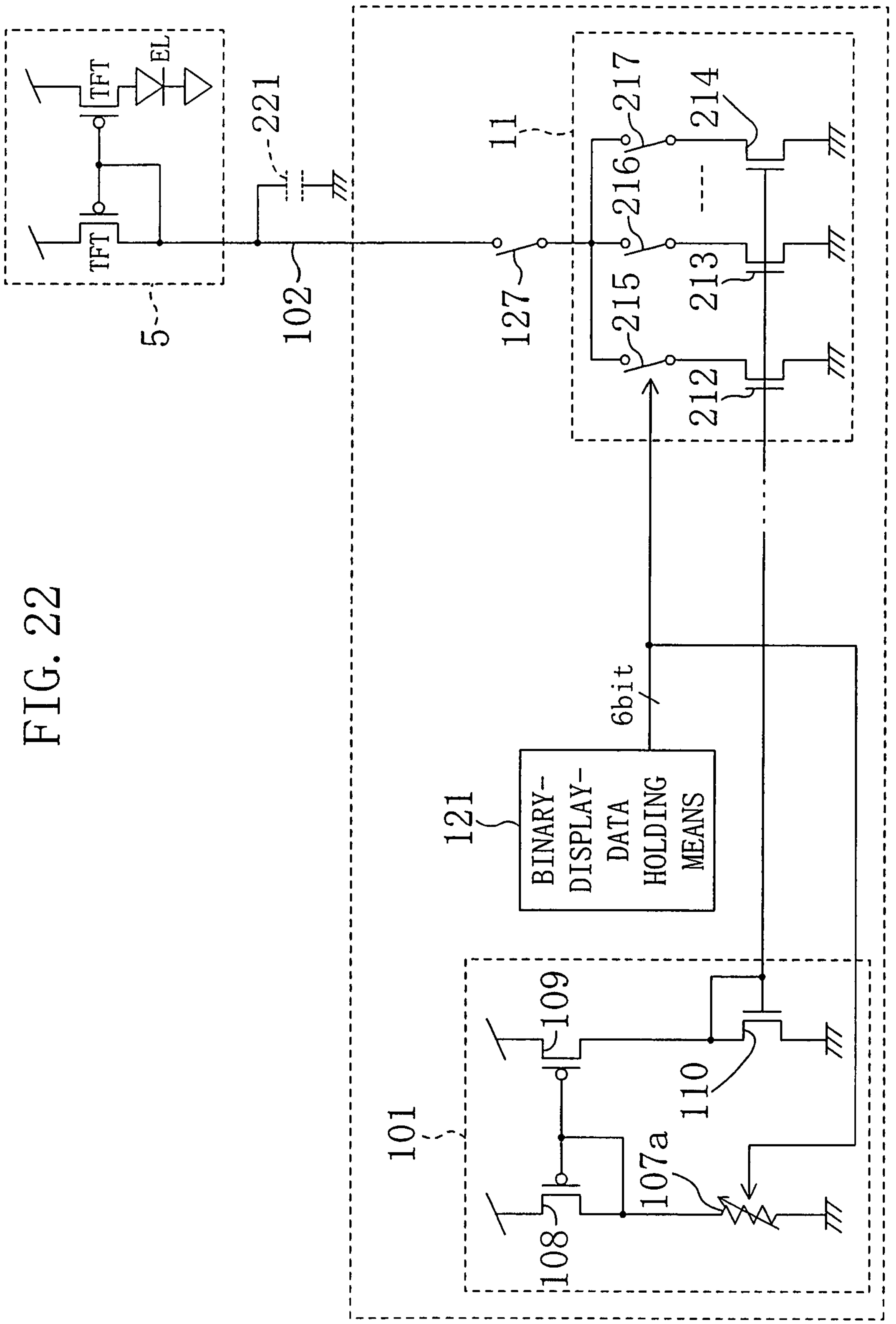
FIG. 22 is a block circuit diagram showing a configuration of an organic EL display apparatus according to an eleventh embodiment of the present invention.
Figure 23:
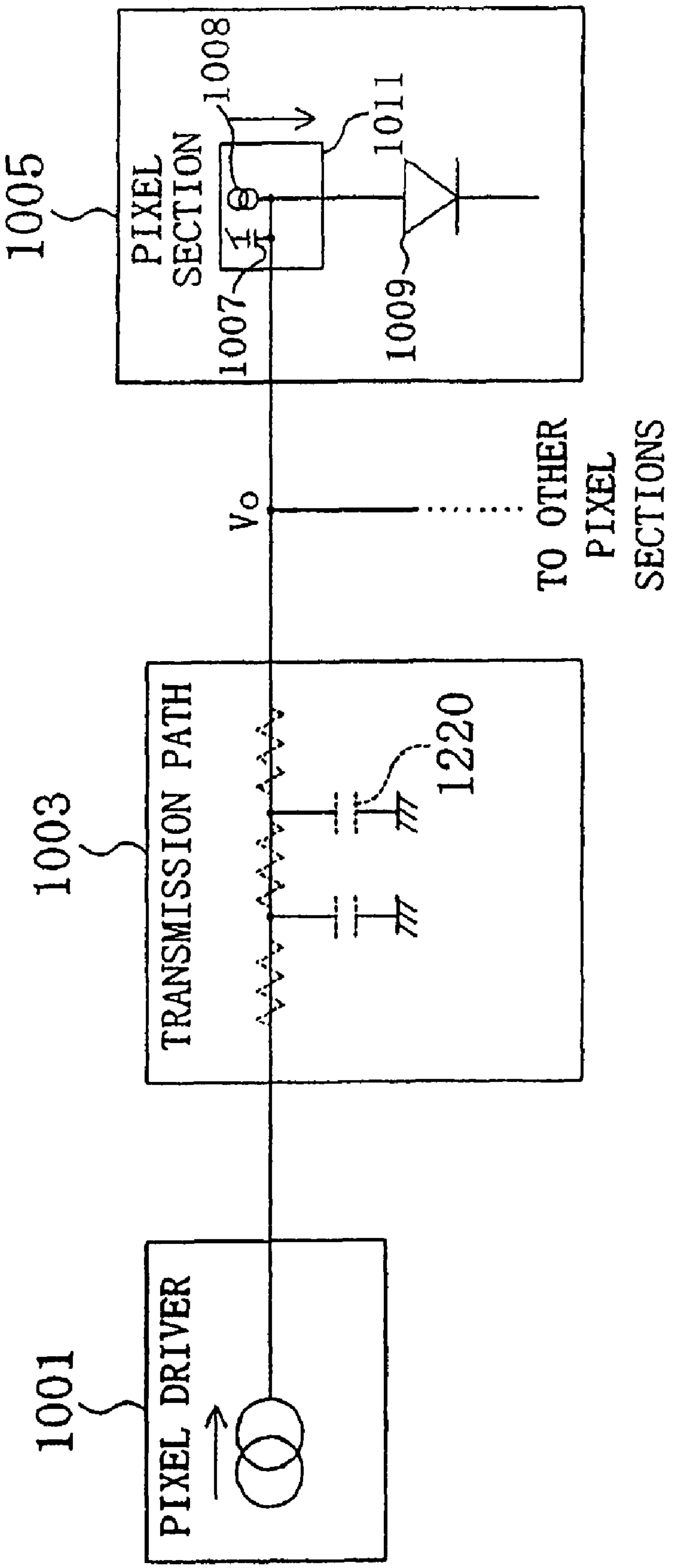
FIG. 23 PRIOR ART
FIG. 23 is a circuit block diagram schematically showing a configuration of a conventional organic EL display apparatus.

FIG. 22 is a block circuit diagram showing a configuration of an organic EL display apparatus according to an eleventh embodiment of the present invention.

As shown in FIG. 22, in the organic EL display apparatus of this embodiment, the resistance 107 for generating a reference current provided in the reference current generator 101 (see FIGS. 18 through 21) is replaced with a variable resistance 107*a*. During a given period in a current setting mode, a data signal from the binary-display-data holding means 121 is transmitted to the variable resistance 107*a* as well as the current driver 11. During the other periods, the data signal from the binary-display-data holding means 121 is not transmitted to the variable resistance 107*a*.

The variable resistance 107*a* increases the reference current by reducing its resistance when receiving a data signal for a high-luminance display, while reducing the reference current by increasing its resistance when receiving a data signal for a low-luminance display. Accordingly, in the organic EL display apparatus of this embodiment, a current drawn into the current driver 11 temporarily increases in a high-luminance display mode, thus allowing the value of a current flowing in a pixel section 5 to reach a target value rapidly. On the other hand, in a low-luminance display mode, control for reducing the current drawn into the current driver 11 is performed.

Accordingly, in the organic EL display apparatus of this embodiment, it is possible to have the value of the current flowing in the pixel section 5 reach a target value in a short time when a low-luminance display is switched to a high-luminance display, thus achieving a high-resolution display without loss of image quality.

In the organic EL display apparatus of this embodiment, the data signal transmitted from the binary-display-data holding means 121 to the variable resistance 107*a* may have only part of 6 bits, e.g., the one or two most significant bits. In such a case, the increase of the circuit area is suppressed.

In the example shown in FIG. 22, TFTs provided in the pixel section 5 are of a p-channel type and MOSFETs constituting power sources in the current driver 11 are of an n-channel type. Alternatively, the TFTs may be of an n-channel type and the MOSFETs constituting the power sources may be of a p-channel type. In such a case, the conductivity type of MOSFETs constituting the reference current generator 101 is also switched. This is also applicable to the organic EL display apparatuses of not only this embodiment but also the other foregoing embodiments.

The organic EL display apparatus of the present invention includes a means for reducing the output impedance with respect to the panel only during a given period in a current setting mode, so that the value of a current flowing in a pixel section reaches a target value in a short time when a black display is switched to a white display. Accordingly, a high-resolution display is achieved without loss of image quality.

In addition, the source driver includes a voltage driver for applying a voltage to a pixel section only during a given period in the current setting mode, so that a parasitic capacitance in the panel is charged/discharged rapidly. Accordingly, it is possible to have the value of the current flowing in the pixel section reach a target value in a short time. As a result, a high-resolution display is achieved without loss of image quality.

Since the organic EL display apparatus according to the present invention includes: the voltage driver for supplying a voltage for allowing a source driver to drive a pixel section; and a voltage value detector for detecting the value of a drive current flowing from the pixel section and feeding back the detection result to the voltage driver, so that it is possible to have the value of the current flowing in the pixel section reach a target value in a shorter time than in a conventional apparatus.

What is claimed is:

1. A display apparatus, comprising:

a display panel provided with a pixel section including a light-emitting device driven by a current and with a signal line connected to the pixel section; and a source driver for supplying a drive current to the pixel section via the signal line, wherein the source driver includes:

a register for latching display data having N bits and for outputting the display data;

a current driver for outputting the drive current according to the display data input from the register;

voltage supplying means having an output impedance lower than that of the current driver;

a line for connecting the signal line and the voltage supplying means to each other;

a timing control unit for outputting a control signal; and a short-circuit switch provided on the line and used for electrically connecting the signal line and the voltage supplying means to each other only during a given period in a current setting mode in accordance with the control signal.

2. The display apparatus of claim 1, wherein the voltage supplying means includes:

a dummy circuit including: a dummy pixel section which is provided on the display panel, includes a TFT and a capacitance and is not used for a display; a dummy signal line provided on the display panel and used for supplying a current to the dummy pixel section; and a dummy pixel driver provided in the source driver, connected to the dummy signal line and including a dummy current driver for outputting a constant current during operation; and a current amplifying buffer connected to the dummy current driver and used for outputting an output voltage of the dummy current driver to the signal line.

3. The display apparatus of claim 1, wherein the current driver is plural in number, and the voltage supplying means is singular in number with respect to the plurality of current drivers.

4. The display apparatus of claim 1, wherein the voltage supplying means is a voltage-output D/A converter provided in a one-to-one correspondence with the current driver and capable of changing an output voltage of the D/A converter in accordance with the display data output from the register.

5. The display apparatus of claim 4, wherein the voltage-output D/A converter changes the output voltage of the D/A converter in accordance with the one or two most significant bits of the display data.

6. The display apparatus of claim 1, wherein the voltage supplying means is a line connected to an external power supply.

7. A source driver, comprising:

a register for latching display data having N bits and for outputting the display data;

a current driver having an output terminal for outputting the drive current according to the display data input from the register;

voltage supplying means having an output impedance lower than that of the current driver;

a line for connecting the output terminal of the current driver and the voltage supplying means;

a timing control unit for outputting a control signal; and a short-circuit switch provided on the line and used for electrically connecting the line and the voltage supplying means to each other only during a given period in a current setting mode in accordance with the control signal.

* * * * *